US008243797B2

(12) United States Patent
Lin et al.

(10) Patent No.: US 8,243,797 B2
(45) Date of Patent: Aug. 14, 2012

(54) REGIONS OF INTEREST FOR QUALITY ADJUSTMENTS

(75) Inventors: Chih-Lung Lin, Redmond, WA (US); Ming-Chieh Lee, Bellevue, WA (US); Stacey Spears, Sammamish, WA (US); Philip Lawrence Garrett, Woodinville, WA (US); Anil Madhav Murching, Redmond, WA (US); Amy Jennifer Beauford, Carnation, WA (US); Thomas W. Holcomb, Bothell, WA (US); Xiping Zuo, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1471 days.

(21) Appl. No.: 11/731,851

(22) Filed: Mar. 30, 2007

(65) Prior Publication Data

US 2008/0240250 A1   Oct. 2, 2008

(51) Int. Cl.
*H04N 11/02* (2006.01)
(52) U.S. Cl. .............................. 375/240.05; 375/240.03
(58) Field of Classification Search ........................ None
See application file for complete search history.

(56) References Cited

U.S. PATENT DOCUMENTS

| | | | |
|---|---|---|---|
| 4,583,114 A | 4/1986 | Catros | |
| 4,679,079 A | 7/1987 | Catros et al. | |
| 4,774,574 A | 9/1988 | Daly et al. | |
| 4,821,119 A | 4/1989 | Gharavi | |
| 4,862,264 A | 8/1989 | Wells et al. | |
| 4,965,830 A | 10/1990 | Barham et al. | |
| 4,992,889 A | 2/1991 | Yamagami et al. | |
| 5,072,295 A | 12/1991 | Murakami et al. | |
| 5,128,758 A | 7/1992 | Azadegan et al. | |
| 5,136,377 A | 8/1992 | Johnston et al. | |
| 5,144,426 A | 9/1992 | Tanaka et al. | |
| 5,179,442 A | 1/1993 | Azadegan et al. | |
| 5,237,410 A | 8/1993 | Inoue | |
| 5,241,395 A | 8/1993 | Chen | |
| 5,253,058 A | 10/1993 | Gharavi | |
| 5,263,088 A | 11/1993 | Hazu et al. | |

(Continued)

FOREIGN PATENT DOCUMENTS

CA        1327074        2/1994

(Continued)

OTHER PUBLICATIONS

Correia et al., Classification of Video Segmentation Application Scenarios, 2004, IEEE, pp. 735-741.*

(Continued)

*Primary Examiner* — Minh Dinh
(74) *Attorney, Agent, or Firm* — Klarquist Sparkman, LLP

(57) ABSTRACT

Quality settings established by an encoder are adjusted based on information associated with regions of interest ("ROIs"). For example, quantization step sizes can be reduced (to improve quality) or increased (to reduce bit rate). ROIs can be identified and quality settings can be adjusted based on input received from a user interface. An overlap setting can be determined for a portion of a picture that corresponds to an ROI overlap area. For example, an overlap setting is chosen from step sizes corresponding to a first overlapping ROI and a second overlapping ROI, or from relative reductions in step size corresponding to the first ROI and the second ROI. ROIs can be parameterized by information (e.g., using data structures) that indicates spatial dimensions of the ROIs and quality adjustment information (e.g., dead zone information, step size information, and quantization mode information).

14 Claims, 12 Drawing Sheets

U.S. PATENT DOCUMENTS

| | | | |
|---|---|---|---|
| 5,301,242 A | 4/1994 | Gonzales et al. |
| 5,303,058 A | 4/1994 | Fukuda et al. |
| 5,317,396 A | 5/1994 | Fujinami |
| 5,317,672 A | 5/1994 | Crossman et al. |
| 5,333,212 A | 7/1994 | Ligtenberg |
| 5,351,310 A | 9/1994 | Califano et al. |
| 5,374,958 A | 12/1994 | Yanagihara |
| 5,412,429 A | 5/1995 | Glover |
| 5,452,104 A | 9/1995 | Lee |
| 5,461,421 A | 10/1995 | Moon |
| 5,473,377 A | 12/1995 | Kim |
| 5,481,553 A | 1/1996 | Suzuki et al. |
| 5,506,916 A | 4/1996 | Nishihara et al. |
| 5,510,785 A | 4/1996 | Segawa et al. |
| 5,537,440 A | 7/1996 | Eyuboglu et al. |
| 5,537,493 A | 7/1996 | Wilkinson |
| 5,539,469 A | 7/1996 | Jung |
| 5,559,557 A | 9/1996 | Kato |
| 5,565,920 A | 10/1996 | Lee et al. |
| 5,587,708 A | 12/1996 | Chiu |
| 5,606,371 A | 2/1997 | Gunnewiek et al. |
| 5,623,424 A | 4/1997 | Azadegan et al. |
| 5,631,644 A | 5/1997 | Katata et al. |
| 5,654,760 A | 8/1997 | Ohtsuki |
| 5,657,087 A | 8/1997 | Jeong et al. |
| 5,663,763 A | 9/1997 | Yagasaki et al. |
| 5,724,097 A | 3/1998 | Hibi et al. |
| 5,724,456 A | 3/1998 | Boyack et al. |
| 5,731,836 A | 3/1998 | Lee |
| 5,731,837 A | 3/1998 | Hurst, Jr. |
| 5,739,861 A | 4/1998 | Music |
| 5,751,358 A | 5/1998 | Suzuki et al. |
| 5,751,379 A | 5/1998 | Markandey et al. |
| 5,761,088 A | 6/1998 | Hulyalkar et al. |
| 5,764,803 A | 6/1998 | Jacquin et al. |
| 5,781,788 A | 7/1998 | Woo et al. |
| 5,786,856 A | 7/1998 | Hall et al. |
| 5,802,213 A | 9/1998 | Gardos |
| 5,809,178 A | 9/1998 | Anderson et al. |
| 5,815,097 A | 9/1998 | Schwartz et al. |
| 5,819,035 A | 10/1998 | Devaney et al. |
| 5,825,310 A | 10/1998 | Tsutsui |
| 5,835,145 A | 11/1998 | Ouyang et al. |
| 5,835,237 A | 11/1998 | Ebrahimi |
| 5,844,613 A | 12/1998 | Chaddha |
| 5,850,482 A | 12/1998 | Meany et al. |
| 5,867,167 A | 2/1999 | Deering |
| 5,870,435 A | 2/1999 | Choi et al. |
| 5,877,813 A | 3/1999 | Lee et al. |
| 5,878,166 A | 3/1999 | Legall |
| 5,880,775 A | 3/1999 | Ross |
| 5,883,672 A | 3/1999 | Suzuki et al. |
| 5,926,791 A | 7/1999 | Ogata et al. |
| 5,969,764 A | 10/1999 | Sun et al. |
| 5,970,173 A | 10/1999 | Lee et al. |
| 5,990,957 A | 11/1999 | Ryoo |
| 6,044,115 A | 3/2000 | Horiike et al. |
| 6,049,630 A | 4/2000 | Wang et al. |
| 6,058,362 A | 5/2000 | Malvar |
| 6,072,831 A | 6/2000 | Chen |
| 6,084,636 A | 7/2000 | Sugahara et al. |
| 6,088,392 A | 7/2000 | Rosenberg |
| 6,091,777 A | 7/2000 | Guetz et al. |
| 6,104,751 A | 8/2000 | Artieri |
| 6,118,817 A | 9/2000 | Wang |
| 6,118,903 A | 9/2000 | Liu |
| 6,125,140 A | 9/2000 | Wilkinson |
| 6,148,107 A | 11/2000 | Ducloux et al. |
| 6,148,109 A | 11/2000 | Boon et al. |
| 6,160,846 A | 12/2000 | Chiang et al. |
| 6,167,091 A | 12/2000 | Okada et al. |
| 6,182,034 B1 | 1/2001 | Malvar |
| 6,212,232 B1 | 4/2001 | Reed et al. |
| 6,215,905 B1 | 4/2001 | Lee et al. |
| 6,223,162 B1 | 4/2001 | Chen et al. |
| 6,240,135 B1 | 5/2001 | Kim |
| 6,240,380 B1 | 5/2001 | Malvar |
| 6,243,497 B1 | 6/2001 | Chiang et al. |
| 6,249,614 B1 | 6/2001 | Bocharova et al. |
| 6,256,422 B1 | 7/2001 | Mitchell et al. |
| 6,256,423 B1 | 7/2001 | Krishnamurthy et al. |
| 6,263,022 B1 | 7/2001 | Chen et al. |
| 6,263,024 B1 | 7/2001 | Matsumoto |
| 6,275,614 B1 | 8/2001 | Krishnamurthy et al. |
| 6,278,735 B1 | 8/2001 | Mohsenian |
| 6,292,588 B1 | 9/2001 | Shen et al. |
| 6,314,208 B1 | 11/2001 | Konstantinides et al. |
| 6,337,881 B1 | 1/2002 | Chaddha |
| 6,347,116 B1 | 2/2002 | Haskell et al. |
| 6,348,945 B1 | 2/2002 | Hayakawa |
| 6,356,709 B1 | 3/2002 | Abe et al. |
| 6,359,928 B1 | 3/2002 | Wang et al. |
| 6,360,017 B1 | 3/2002 | Chiu et al. |
| 6,370,502 B1 | 4/2002 | Wu et al. |
| 6,373,894 B1 | 4/2002 | Florencio et al. |
| 6,385,343 B1 | 5/2002 | Kuroda et al. |
| 6,389,171 B1 | 5/2002 | Washington |
| 6,393,155 B1 | 5/2002 | Bright et al. |
| 6,408,026 B1 | 6/2002 | Tao |
| 6,418,166 B1 | 7/2002 | Wu et al. |
| 6,438,167 B1 | 8/2002 | Shimizu et al. |
| 6,456,744 B1 | 9/2002 | Lafe |
| 6,463,100 B1 | 10/2002 | Cho et al. |
| 6,466,620 B1 | 10/2002 | Lee |
| 6,473,534 B1 | 10/2002 | Merhav et al. |
| 6,490,319 B1 | 12/2002 | Yang |
| 6,493,385 B1 | 12/2002 | Sekiguchi et al. |
| 6,519,284 B1 | 2/2003 | Pesquet-Popescu et al. |
| 6,526,096 B2 | 2/2003 | Lainema et al. |
| 6,546,049 B1 | 4/2003 | Lee |
| 6,571,019 B1 | 5/2003 | Kim et al. |
| 6,593,925 B1 | 7/2003 | Hakura et al. |
| 6,600,836 B1 | 7/2003 | Thyagarajan et al. |
| 6,647,152 B2 | 11/2003 | Willis et al. |
| 6,654,417 B1 | 11/2003 | Hui |
| 6,678,422 B1 | 1/2004 | Sharma et al. |
| 6,687,294 B2 | 2/2004 | Yan et al. |
| 6,704,718 B2 | 3/2004 | Burges et al. |
| 6,721,359 B1 | 4/2004 | Bist et al. |
| 6,728,317 B1 | 4/2004 | Demos |
| 6,731,811 B1 | 5/2004 | Rose |
| 6,738,423 B1 | 5/2004 | Lainema et al. |
| 6,747,660 B1 | 6/2004 | Olano et al. |
| 6,759,999 B1 | 7/2004 | Doyen |
| 6,760,482 B1 | 7/2004 | Taubman |
| 6,765,962 B1 | 7/2004 | Lee et al. |
| 6,771,830 B2 | 8/2004 | Goldstein et al. |
| 6,785,331 B1 | 8/2004 | Jozawa et al. |
| 6,788,740 B1 | 9/2004 | Van der Schaar et al. |
| 6,792,157 B1 | 9/2004 | Koshi et al. |
| 6,795,584 B2 | 9/2004 | Karczewicz et al. |
| 6,801,572 B2 | 10/2004 | Yamada et al. |
| 6,807,317 B2 | 10/2004 | Mathew et al. |
| 6,810,083 B2 | 10/2004 | Chen et al. |
| 6,831,947 B2 | 12/2004 | Ribas Corbera |
| 6,862,320 B1 | 3/2005 | Isu et al. |
| 6,865,291 B1 | 3/2005 | Zador |
| 6,873,654 B1 | 3/2005 | Rackett |
| 6,876,703 B2 | 4/2005 | Ismaeil et al. |
| 6,882,753 B2 | 4/2005 | Chen et al. |
| 6,907,142 B2 | 6/2005 | Kalevo et al. |
| 6,909,745 B1 | 6/2005 | Puri et al. |
| 6,947,045 B1 | 9/2005 | Ostermann et al. |
| 6,975,680 B2 | 12/2005 | Demos |
| 6,977,659 B2 | 12/2005 | Dumitras et al. |
| 6,983,018 B1 | 1/2006 | Lin et al. |
| 6,990,242 B2 | 1/2006 | Malvar |
| 7,016,546 B2 | 3/2006 | Fukuhara et al. |
| 7,020,204 B2 | 3/2006 | Auvray et al. |
| 7,027,506 B2 * | 4/2006 | Lee et al. ............... 375/240.03 |
| 7,027,507 B2 | 4/2006 | Wu |
| 7,035,473 B1 | 4/2006 | Zeng et al. |
| 7,042,941 B1 | 5/2006 | Laksono et al. |
| 7,058,127 B2 | 6/2006 | Lu et al. |
| 7,099,389 B1 | 8/2006 | Yu et al. |
| 7,099,515 B2 | 8/2006 | Lin et al. |
| 7,110,455 B2 | 9/2006 | Wu et al. |

| | | | | | | |
|---|---|---|---|---|---|---|
| 7,162,096 | B1 | 1/2007 | Horowitz | 2005/0190836 A1 | 9/2005 | Lu et al. |
| 7,200,277 | B2 | 4/2007 | Joshi et al. | 2005/0207492 A1 | 9/2005 | Pao |
| 7,289,154 | B2 | 10/2007 | Gindele | 2005/0232501 A1 | 10/2005 | Mukerjee |
| 7,295,609 | B2 | 11/2007 | Sato et al. | 2005/0238096 A1 | 10/2005 | Holcomb et al. |
| 7,301,999 | B2 | 11/2007 | Filippini et al. | 2005/0254719 A1 | 11/2005 | Sullivan |
| 7,307,639 | B1 | 12/2007 | Dumitras et al. | 2005/0259729 A1 | 11/2005 | Sun |
| 7,356,085 | B2 | 4/2008 | Gavrilescu et al. | 2005/0276493 A1 | 12/2005 | Xin et al. |
| 7,463,780 | B2 * | 12/2008 | Fukuhara et al. ............. 382/240 | 2006/0013307 A1 | 1/2006 | Olivier et al. |
| 7,471,830 | B2 | 12/2008 | Lim et al. | 2006/0013309 A1 | 1/2006 | Ha et al. |
| 7,580,584 | B2 | 8/2009 | Holcomb et al. | 2006/0018552 A1 | 1/2006 | Malayath et al. |
| 7,738,554 | B2 | 6/2010 | Lin et al. | 2006/0034368 A1 | 2/2006 | Klivington |
| 7,778,476 | B2 | 8/2010 | Alvarez et al. | 2006/0038826 A1 | 2/2006 | Daly |
| 7,801,383 | B2 | 9/2010 | Sullivan | 2006/0056508 A1 | 3/2006 | Lafon et al. |
| 7,869,517 | B2 | 1/2011 | Ghanbari | 2006/0071825 A1 | 4/2006 | Demos |
| 7,889,790 | B2 | 2/2011 | Sun | 2006/0083308 A1 | 4/2006 | Schwarz et al. |
| 7,995,649 | B2 | 8/2011 | Zuo et al. | 2006/0088098 A1 | 4/2006 | Vehvilainen |
| 2001/0048718 | A1 | 12/2001 | Bruls et al. | 2006/0098733 A1 | 5/2006 | Matsumura et al. |
| 2002/0021756 | A1 | 2/2002 | Jayant et al. | 2006/0104350 A1 | 5/2006 | Liu |
| 2002/0044602 | A1 | 4/2002 | Ohki | 2006/0104527 A1 | 5/2006 | Koto et al. |
| 2002/0118748 | A1 | 8/2002 | Inomata et al. | 2006/0126724 A1 | 6/2006 | Cote |
| 2002/0118884 | A1 | 8/2002 | Cho et al. | 2006/0126728 A1 | 6/2006 | Yu et al. |
| 2002/0136297 | A1 | 9/2002 | Shimada et al. | 2006/0133478 A1 | 6/2006 | Wen |
| 2002/0136308 | A1 | 9/2002 | Le Maguet et al. | 2006/0133479 A1 | 6/2006 | Chen et al. |
| 2002/0154693 | A1 | 10/2002 | Demos et al. | 2006/0140267 A1 | 6/2006 | He et al. |
| 2002/0186890 | A1 | 12/2002 | Lee et al. | 2006/0165176 A1 | 7/2006 | Raveendran et al. |
| 2003/0021482 | A1 | 1/2003 | Lan et al. | 2006/0188014 A1 | 8/2006 | Civanlar et al. |
| 2003/0053702 | A1 | 3/2003 | Hu | 2006/0197777 A1 | 9/2006 | Cha et al. |
| 2003/0095599 | A1 | 5/2003 | Lee et al. | 2006/0227868 A1 | 10/2006 | Chen et al. |
| 2003/0103677 | A1 | 6/2003 | Tastl et al. | 2006/0238444 A1 | 10/2006 | Wang et al. |
| 2003/0108100 | A1 | 6/2003 | Sekiguchi et al. | 2006/0239576 A1 | 10/2006 | Mukherjee |
| 2003/0113026 | A1 | 6/2003 | Srinivasan et al. | 2006/0245506 A1 | 11/2006 | Lin et al. |
| 2003/0128754 | A1 | 7/2003 | Akimoto et al. | 2006/0256851 A1 | 11/2006 | Wang et al. |
| 2003/0128756 | A1 | 7/2003 | Oktem | 2006/0256867 A1 | 11/2006 | Turaga et al. |
| 2003/0138150 | A1 | 7/2003 | Srinivasan | 2006/0257037 A1 | 11/2006 | Samadani |
| 2003/0185420 | A1 | 10/2003 | Sefcik et al. | 2006/0268990 A1 | 11/2006 | Lin et al. |
| 2003/0194010 | A1 | 10/2003 | Srinivasan et al. | 2006/0268991 A1 | 11/2006 | Segall et al. |
| 2003/0206582 | A1 | 11/2003 | Srinivasan et al. | 2007/0002946 A1 * | 1/2007 | Bouton et al. ........... 375/240.01 |
| 2003/0215011 | A1 | 11/2003 | Wang et al. | 2007/0009039 A1 | 1/2007 | Ryu |
| 2003/0219073 | A1 | 11/2003 | Lee et al. | 2007/0009042 A1 | 1/2007 | Craig et al. |
| 2003/0223493 | A1 | 12/2003 | Ye et al. | 2007/0053603 A1 | 3/2007 | Monro |
| 2004/0008901 | A1 | 1/2004 | Avinash | 2007/0081588 A1 | 4/2007 | Raveendran et al. |
| 2004/0022316 | A1 | 2/2004 | Ueda et al. | 2007/0140333 A1 | 6/2007 | Chono et al. |
| 2004/0036692 | A1 | 2/2004 | Alcorn et al. | 2007/0147497 A1 | 6/2007 | Bao et al. |
| 2004/0090397 | A1 | 5/2004 | Doyen et al. | 2007/0160138 A1 | 7/2007 | Wedi et al. |
| 2004/0091168 | A1 | 5/2004 | Jones et al. | 2007/0160151 A1 | 7/2007 | Bolton et al. |
| 2004/0151243 | A1 | 8/2004 | Bhaskaran et al. | 2007/0189626 A1 | 8/2007 | Tanizawa et al. |
| 2004/0158719 | A1 | 8/2004 | Lee et al. | 2007/0201553 A1 | 8/2007 | Shindo |
| 2004/0190610 | A1 | 9/2004 | Song et al. | 2007/0230565 A1 | 10/2007 | Tourapis et al. |
| 2004/0202376 | A1 | 10/2004 | Schwartz et al. | 2007/0237221 A1 | 10/2007 | Hsu et al. |
| 2004/0228406 | A1 | 11/2004 | Song | 2007/0237222 A1 | 10/2007 | Xia et al. |
| 2004/0264568 | A1 | 12/2004 | Florencio | 2007/0237236 A1 | 10/2007 | Chang et al. |
| 2004/0264580 | A1 | 12/2004 | Chiang Wei Yin et al. | 2007/0237237 A1 | 10/2007 | Chang et al. |
| 2005/0002575 | A1 | 1/2005 | Joshi et al. | 2007/0248163 A1 | 10/2007 | Zuo et al. |
| 2005/0008075 | A1 | 1/2005 | Chang | 2007/0248164 A1 | 10/2007 | Zuo et al. |
| 2005/0013365 | A1 | 1/2005 | Mukerjee et al. | 2007/0258518 A1 | 11/2007 | Tu et al. |
| 2005/0013497 | A1 | 1/2005 | Hsu et al. | 2007/0258519 A1 | 11/2007 | Srinivasan |
| 2005/0013498 | A1 | 1/2005 | Srinivasan et al. | 2008/0008394 A1 | 1/2008 | Segall |
| 2005/0013500 | A1 | 1/2005 | Lee et al. | 2008/0031346 A1 | 2/2008 | Segall |
| 2005/0015246 | A1 | 1/2005 | Thumpudi et al. | 2008/0068446 A1 | 3/2008 | Barkley et al. |
| 2005/0015259 | A1 | 1/2005 | Thumpudi et al. | 2008/0080615 A1 | 4/2008 | Tourapis et al. |
| 2005/0024487 | A1 | 2/2005 | Chen | 2008/0089410 A1 | 4/2008 | Lu et al. |
| 2005/0031034 | A1 | 2/2005 | Kamaci et al. | 2008/0101465 A1 | 5/2008 | Chono et al. |
| 2005/0036698 | A1 | 2/2005 | Beom | 2008/0187042 A1 | 8/2008 | Jasinschi |
| 2005/0036699 | A1 | 2/2005 | Holcomb et al. | 2008/0192822 A1 | 8/2008 | Chang et al. |
| 2005/0041738 | A1 | 2/2005 | Lin et al. | 2008/0240235 A1 | 10/2008 | Holcomb et al. |
| 2005/0052294 | A1 | 3/2005 | Liang et al. | 2008/0240257 A1 | 10/2008 | Chang et al. |
| 2005/0053151 | A1 | 3/2005 | Lin et al. | 2008/0260278 A1 | 10/2008 | Zuo et al. |
| 2005/0053158 | A1 | 3/2005 | Regunathan et al. | 2008/0304562 A1 | 12/2008 | Chang et al. |
| 2005/0084009 | A1 * | 4/2005 | Furukawa et al. ....... 375/240.03 | 2009/0207919 A1 | 8/2009 | Yin et al. |
| 2005/0084013 | A1 | 4/2005 | Wang et al. | 2009/0213930 A1 | 8/2009 | Ye et al. |
| 2005/0094731 | A1 | 5/2005 | Xu et al. | 2009/0245587 A1 | 10/2009 | Holcomb et al. |
| 2005/0105612 | A1 | 5/2005 | Sung et al. | 2009/0290635 A1 * | 11/2009 | Kim et al. ................. 375/240.02 |
| 2005/0105622 | A1 | 5/2005 | Gokhale | 2009/0296808 A1 | 12/2009 | Regunathan et al. |
| 2005/0123274 | A1 | 6/2005 | Crinon et al. | 2010/0177826 A1 | 7/2010 | Bhaumik et al. |
| 2005/0135484 | A1 | 6/2005 | Lee et al. | | | |
| 2005/0147163 | A1 | 7/2005 | Li et al. | | | |

FOREIGN PATENT DOCUMENTS

| | | |
|---|---|---|
| 2005/0152451 A1 | 7/2005 | Byun |
| 2005/0180500 A1 | 8/2005 | Chiang et al. |
| 2005/0180502 A1 | 8/2005 | Puri |

| | | |
|---|---|---|
| EP | 0932306 | 7/1999 |
| EP | 1465349 | 10/2004 |
| EP | 1871113 | 12/2007 |

| | | |
|---|---|---|
| GB | 897363 | 5/1962 |
| JP | 05-227525 | 9/1993 |
| JP | 6-296275 | 10/1994 |
| JP | 07-222145 | 8/1995 |
| JP | 07-250327 | 9/1995 |
| JP | 08-336139 | 12/1996 |
| JP | 10-336656 | 12/1998 |
| JP | 11-041610 | 2/1999 |
| JP | 2003061090 | 2/2003 |
| JP | 2007-281949 | 10/2007 |
| WO | WO 97/21302 | 6/1997 |
| WO | WO 99/48300 | 9/1999 |
| WO | WO 00/21207 | 4/2000 |
| WO | WO 00/72599 | 11/2000 |
| WO | WO 02/07438 | 1/2002 |
| WO | WO 2004/100554 | 11/2004 |
| WO | WO 2004/100556 | 11/2004 |
| WO | WO 2005/065030 | 7/2005 |
| WO | WO 2005/076614 | 8/2005 |
| WO | WO 2006/075895 | 7/2006 |
| WO | WO 2006/112620 A1 | 10/2006 |
| WO | WO 2007/015047 | 2/2007 |
| WO | WO 2007/130580 | 11/2007 |

OTHER PUBLICATIONS

Daly et al., Face-Based Visually-Optimized Image Sequence Coding, 1998, IEEE, pp. 443-447.*
Chai et al., Face Segmentation Using Skin Color Map in Videophone Application, 1999, IEEE, pp. 551-564.*
Lee et al., Spatio-Temporal Model-Assisted Compatible Coding for Low and Very Low Bit Rate Video Telephony, 1996, IEEE, pp. 1-4.*
Atzori et al., "Adaptive Anisotropic Filtering (AAF) for Real-Time Visual Enhancement of MPEG-Coded Video Sequences," IEEE Transactions on Circuits and Systems for Video Technology, vol. 12, No. 5, pp. 285-298 (May 2002).
Bist et al., "Adaptive Quantization for Low Bit Rate Video Coding," Proc. 1998 Int'l Conf. on Image Processing (ICIP 98), pp. 925-928 (Oct. 1998).
Chang et al., "Adaptive Wavelet Thresholding for Image Denoising and Compression," IEEE Trans on Image Processing, vol. 9, No. 9, pp. 1532-1546 (Sep. 2000).
Chrysafis et al., "Context-based Adaptive Image Coding," Proc. of the 30th Asilomar Conf. on Signals, Systems, and Computers, 5 pp. (Nov. 1996).
De Simone, et al., "A comparative study of JPEG 2000, AVC/H.264, and HD Photo," SPIE Optics and Photonics, Applications of Digital Image Processing XXX, 12 pp. (Aug. 2007).
Farvardin et al., "Optimum quantizer performance for a class of non-Gaussian memoryless sources," IEEE Trans. Inform. Theory, vol. IT-30, No. 3, pp. 485-497 (May 1984).
Flierl et al., "A Video Codec Incorporating Block-Based Multi-Hypothesis Motion-Compensated Prediction," in Proceedings of the SPIE Conference on Visual Communications and Image Processing, Perth, Australia, vol. 4067, pp. 238-249 (Jun. 2000).
Flierl et al., "Generalized B Pictures and the Draft H.264/AVC Video Compression Standard," in IEEE Transactions on Circuits and Systems for Video Technology, vol. 13, No. 7, pp. 587-597 (Jul. 2003).
Foos et al., "JPEG 2000 compression of medical imagery," Proc. SPIE, vol. 3980, pp. 85-96 (Feb. 2000).
Garrigues et al., "Atom position coding in a matching pursuit based video coder," Lecture Notes in Computer Science, 4 pp. (Sep. 2005).
Gavrilescu et al., "Embedded Multiple Description Scalar Quantizers," IEE Electronics Letters, vol. 39, No. 13, 12 pp. (Jun. 2003).
Gish et al., "Asymptotically efficient quantizing," IEEE Trans. Inform. Theory, vol. IT-14, No. 5 (Sep. 1968).
Golner et al., "Region Based Variable Quantization for JPEG Image Compression," IEEE Symp. on Circuits and Systems, pp. 604-607 (Aug. 2000).
Golston et al., "Video codecs tutorial: Trade-offs with H.264, VC-1 and other advanced codecs," Video/Imaging Design Line, 9 pp. (Mar. 2006).
"H.264 & IPTV Over DSL—Enabling New Telco Revenue Opportunities," White Paper, 12 pp. (May 15, 2004).

"ISO/IEC 11172-2 Coding of moving pictures and associated audio for digital storage media at up to about 1.5 Mbit/s," MPEG (Moving Pictures Expert Group), International Organization for Standardization, MPEG1 Video, 122 pp. (Aug. 1993).
"ISO/IEC 13818-2. Generic coding of moving pictures and associated audio information," MPEG (Moving Pictures Expert Group), International Organization for Standardization, MPEG2 Video, 23 pp. (Dec. 2000).
ISO/IEC, "14496-2: Information Technology—Coding of Audio-Visual Objects—Part 2: Visual," 724 pp. (Jun. 2004).
ITU-T, "ITU-T Recommendation H.261: Video Codec for Audiovisual Services at p × 64 kbits," 28 pp. (Mar. 1993).
ITU-T, "ITU-T Recommendation H.262: Information Technology—Generic Coding of Moving Pictures and Associated Audio Information: Video," 218 pp. (Jul. 1995).
ITU-T, "ITU-T Recommendation H.263: Video Coding for Low Bit Rate Communication," 167 pp. (Feb. 1998).
Joint Video Team (JVT) of ISO/IEC MPEG & ITU-T VCEG, "Draft ITU-T Recommendation and Final Draft International Standard of Joint Video Specification (ITU-T Rec. H.264 ISO/IEC 14496-10 AVC," 253 pp. (May 2003).
Joshi et al., "Comparison of generalized Gaussian and Laplacian modeling in DCT image coding," IEEE Signal Proc. Letters, vol. SPL-2, No. 5, pp. 81-82 (May 1995).
Kim et al., "Still image coding based on vector quantization and fractal approximation," IEEE Transactions on Image Processing, vol. 5, No. 4, pp. 587-597 (Apr. 1996).
Kopp, "Lossless Wavelet Based Image Compression with Adaptive 2D Decomposition," Proc. 4th Int'l Conf. in Central Europe on Computer Graphics and Visualization 96, pp. 141-149 (Feb. 12-16, 1996).
Lam et al., "A mathematical analysis of the DCT coefficient distributions for images," IEEE Trans. Image Proc., vol. IP-9, No. 10, pp. 1661-1666 (Oct. 2000).
LeGall, "MPEG: A Video Compression Standard for Multimedia Application," Communications of the ACM, vol. 34, No. 4, pp. 47-58 (Apr. 1991).
LeGall, "The MPEG Video Compression Algorithm," Signal Processing: Image Communication 4, vol. 4, No. 2, pp. 129-140 (Apr. 1992).
LeGall et al., "Transmission of HDTV signals under 140 Mbit/s using a subband decomposition and Discrete Cosine Transform coding," in Signal Processing of HDTV, Elsevier, Amsterdam, pp. 287-293 (Oct. 1988).
Lei et al., "Rate Adaptation Transcoding for Precoded Video Streams," 13 pp. (month unknown, 2000).
Limb, "A Picture-Coding Algorithm for the Merli Scan," IEEE Transactions on Communications, pp. 300-305 (Apr. 1973).
Lloyd, "Least squares quantization in PCM," IEEE Trans. Inform. Theory, vol. IT-28, No. 2, pp. 7-12 (Mar. 1982) (reprint of work originally presented in Jul. 1957).
Loomis, "Using the Advanced Settings of the Windows Media Video 9 Advanced Profile Codec," 13 pp. (Document dated Apr. 2006) [Downloaded from the World Wide Web on May 31, 2007].
Lopresto et al., "Image Coding Based on Mixture Modeling of Wavelet Coefficients and a Fast Estimation-Quantization Framework," Proc. IEEE Data Compression Conference, (Snowbird, UT), pp. 221-230 (Mar. 1997).
Luo et al., "A Scene Adaptive and Signal Adaptive Quantization for Subband Image and Video Compression Using Wavelets," IEEE Trans. on Circuits and Systems for Video Tech., vol. 7, No. 2, pp. 343-357 (Apr. 1997).
Mallat, "A theory for multiresolution signal decomposition: the wavelet representation," IEEE Trans. Pattern Anal. and Machine Intell., vol. PAMI-11, No. 7, pp. 674-692 (Jul. 1989).
Masala et al., "Perceptually Optimized MPEG Compression of Synthetic Video Sequences," Proc. ICIP, pp. I-601-I-604 (Sep. 2005).
Max, "Quantizing for minimum distortion," IEEE Trans. Inform. Theory, vol. IT-6, No. 1, pp. 7-12 (Mar. 1960).
Microsoft Corporation, "Microsoft Debuts New Windows Media Player 9 Series, Redefining Digital Media on the PC," 4 pp. (Sep. 4, 2002) [Downloaded from the World Wide Web on May 14, 2004].
Mitra et al., "Two-Stage Color Palettization for Error Diffusion," Proceedings of SPIE, pp. 207-217 (Jun. 2002).

Mook, "Next-Gen Windows Media Player Leaks to the Web," BetaNews, 17 pp. (Jul. 19, 2002) [Downloaded from the World Wide Web on Aug. 8, 2003].

Muller, "Distribution shape of two-dimensional DCT coefficients of natural images," IEE Electronics Letters, vol. 29, No. 22 (Oct. 1993).

Murakami et al., "Comparison between DPCM and Hadamard transform coding in the composite coding of the NTSC color TV signal," IEEE Trans. On Commun., vol. COM-30, No. 3, pp. 469-479 (Mar. 1982).

Musmann et al., "Advances in Picture Coding," Proceedings of the IEEE, vol. 73, No. 4, pp. 523-548 (Apr. 1985).

Neff et al., "Modulus Quantization for Matching Pursuit Video Coding," IEEE Transactions on Circuits and Systems for Video Technology, vol. 10, No. 6, pp. 895-912 (Sep. 2000).

Nguyen et al., "Set Theoretic Compression with an Application to Image Coding," IEEE Transactions on Image Processing, vol. 7, No. 7, pp. 1051-1056 (Jul. 1998).

Park et al., "A post processing method for reducing quantization effects in low bit-rate moving picture coding," IEEE Trans. Circuits Syst. Video Technology, vol. 9, pp. 161-171 (Feb. 1999).

Puri et al., "Motion-Compensated Video Coding with Adaptive Perceptual Quantization," IEEE Transactions on Circuits and Systems for Video Technology, vol. 1, No. 4, pp. 351-361 (Dec. 1991).

"Radha et al., The MPEG-4 Fine-Grained Scalable Video Coding Method for Multimedia Streaming Over IP," IEEE Trans. on Multimedia, vol. 3, No. 1, pp. 53-68 (Mar. 2001).

Reininger et al., "Distribution of two-dimensional DCT coefficients for images," IEEE Trans. On Commun., vol. COM-31, No. 6, pp. 835-839 (Jun. 1983).

Ribas Corbera et al., "Rate Control in DCT Video Coding for Low-Delay Communications," IEEE Transactions on Circuits and Systems for Video Technology, vol. 9, No. 1, pp. 172-185 (Feb. 1999).

Schallauer et al., "PRESTO—Preservation Technologies for European Broadcast Archives, D5.4—High Quality Compression for Film and Video," 80 pp. (Sep. 18, 2002).

Schuster et al., "A Theory for the Optimal Bit Allocation Between Displacement Vector Field and Displaced Frame Difference," IEEE J. on Selected Areas in Comm., vol. 15, No. 9, pp. 1739-1751 (Dec. 1997).

Shanableh et al., "Heterogeneous Video Transcoding to Lower Spatio-Temporal Resolutions and Different Encoding Formats," IEEE Transactions on Multimedia, vol. 2, No. 2, pp. 101-110 (Jun. 2000).

Shen et al., "Rate-Distortion Optimization for Fast Hierarchical B-Picture Transcoding," IEEE, pp. 5279-5282 (May 2006).

Shoushun et al., "Adaptive-Quantization Digital Image Sensor for Low-Power Image Compression," in IEEE Transactions on Circuits and Systems—I: Regular Papers, vol. 54, No. 1, pp. 13-25 (Jan. 2007).

Sony Electronics Inc., "Sony Vizaro DVD Encoder System DVA-V700," 4 pp. (Apr. 2001).

Sullivan, "Efficient scalar quantization of exponential and Laplacian random variables," IEEE Trans. Inform. Theory, vol. IT-42, No. 5, pp. 1365-1374 (Sep. 1996).

Sullivan et al., "Rate-Distortion Optimization for Video Compression," IEEE Signal Processing Magazine, pp. 74-90 (Nov. 1998).

Sullivan et al., "The H.264/AVC Advanced Video Coding Standard: Overview and Introduction to the Fidelity Range Extensions," 21 pp. (Aug. 2004).

Tao et al., "Adaptive Model-driven Bit Allocation for MPEG Video Coding," IEEE Transactions on Circuits and Systems for Video Tech., vol. 10, No. 1, pp. 147-157 (Feb. 2000).

Tsang et al., "Fuzzy Based Rate Control for Real-Time MPEG Video," IEEE Transactions on Fuzzy Systems, pp. 504-516 (Nov. 1998).

Wang, et al., "A Framework for Adaptive Scalable Video Coding Using Wyner-Ziv Techniques," EURASIP Journal on Applied Signal Processing, pp. 1-18 (month unknown, 2006).

Watson et al., "Visibility of Wavelet Quantization Noise," IEEE Trans. on Image Processing, vol. 6, No. 8, pp. 1164-1175 (Aug. 1997).

Wien, "Variable Block-Size Transforms for Hybrid Video Coding," Dissertation, 182 pp. (Feb. 2004).

Wu et al., "Context-Based, Adaptive, Lossless Image Coding," IEEE Trans. Communications, vol. 45, pp. 437-444 (Apr. 1997).

Wu et al., "Joint Estimation of Forward and Backward Motion Vectors for Interpolative Prediction of Video," IEEE Transactions on Image Processing, vol. 3, No. 5, pp. 684-687 (Sep. 1994).

Xiong et al., "Wavelet Packet Image Coding Using Space-Frequency Quantization," IEEE Transactions on Image Processing, vol. 7, No. 6, pp. 892-898 (Jun. 1998).

Yang et al., "Rate Control for Videophone Using Local Perceptual Cues," IEEE Transactions on Circuits and Systems for Video Tech., vol. 15, No. 4, pp. 496-507 (Apr. 2005).

Yuen et al., "A survey of hybrid MC/DPCM/DCT video coding distortions," Signal Processing, vol. 70, pp. 247-278 (Nov. 1998).

Zaid et al., "Wavelet Image Coding with Adaptive Thresholding," 4 pp. (Jul. 2002).

Zhang et al., "Adaptive Field/Frame Selection for High Compression Coding," SPIE Conf. on Image and Video Communications and Processing, 13 pp. (Jan. 2003).

Calderbank et al., "Wavelet transforms that map integers to integers," Mathematics Subject Classification, Aug. 1996, 39 pages.

Donoho et al., "Data compression and Harmonic Analysis," IEEE transaction on information theory, vol. 44, No. 6, Oct. 1998, pp. 2435-2476.

ISO/IEC, "Study text (version 3) of ISO/IEC 14496-10:2005/FPDAM3 Scalable Video Coding (in integrated form with ISO/IEC 14996-10)," ISO/IEC JTC 1/SC 29/WG 11 N8962, pp. 59-103, 175-196, 404-423, 453-470 (Apr. 2007).

ITU-T, "CCITT Recommendation T.81: Information Technology—Digital Compresion and Coding of Continuous-Tone Still Images—Requirements and Guidelines," 190 pp. (Sep. 1992).

ITU-T, "ITU-T Recommendation T.84: Terminals for Telematic Services—Information Technology—Digital Compression and Coding of Continuous-Tone Still Images: Extensions," 84 pp. (Jul. 1996).

ITU-T, "ITU-T Recommendation T.801: JPEG 2000 image coding system: Extensions," 334 pp. (Aug. 2002).

Man et al., "Three-Dimensional Subband Coding Techniques for Wireless Video Communications," IEEE Trans. on Circuits and Systems for Video Technology, vol. 12, No. 6, pp. 386-397 (Jun. 2002).

Marcellin et al., "An overview of quantization in JPEG 2000," Signal Processing: Image Communication, vol. 17, pp. 73-84 (Jan. 2002).

Srinivasan et al., "HD Photo: A new image coding technology for digital photography," Proc. of SPIE, Vo. 6696, 19 pp. (Jan. 2007).

Tong, "A perceptually adaptive JPEG coder," Thesis, University of Toronto, 124 pp. (1997).

Watson, "Perceptual Optimization of DCT Color Quantization Matrices," IEEE Conf. on Image Processing, pp. 100-104 (Nov. 1994).

Yoo et al., "Adaptive Quantization of Image Subbands with Efficient Overhead Rate Selection," IEEE Conf. on Image Processing, pp. 361-364 (Sep. 1996).

Augustine et al., "Region of Interest Editing of MPEG-2 Video Streams in the Compressed Domain," *2004 IEEE Int'l Conf. on Multimedia and Expo: ICME'04*. vol. 1, Issue 27-30, pp. 559-562 (Jun. 2004).

Hannuksela et al., "Sub-picture: ROI coding and unequal error protection," *Proc. 2002 Int'l Conf. on Image Processing*, vol. 3, Issue 24-28, pp. 537-540 (Jun. 2002) (http://ieeexplore.ieee.org/Xplore/login.jsp?url=/iel5/8052/22267/01039026.pdf).

Lin et al, "Low-complexity face-assisted coding scheme for low bit rate video telephony," *IEICE Trans. Inf. & Sys.*, vol. E86-D, No. 1, pp. 101-108 (2003).

Lin et al, "Low-complexity face-assisted video coding," *Proc. 2000 Int'l Conf. on Image Processing*, vol. 2, pp. 207-210 (2000) (http://ieeexplore.ieee.org/Xplore/login.jsp?url=/ie15/7221/19473/00899270.pdf).

Malah, "Time-Domain Algorithms for Harmonic Reduction and Time Scaling of Speech Signals," IEEE Transactions on Acoustics, Speech, and Signal Processing, vol. ASSP-27, No. 2, Apr. 1979, 13 pages.

Richardson, H.264 and MPEG-4 Video Compression, pp. 50-56 and 187-196 (2003).

\* cited by examiner

Software 980 implementing described techniques and tools for quality adjustments using regions of interest

```
typedef struct _ROIRect {
    RECT roi_rect; // can be generalized to any spatial subset of a video picture
    int    qp_mode;
    int    I_qp;
    int    P_qp;
    int    B_qp;
    int    roi_option;
    int    intra_deadzone;
    int    inter_deadzone;
} ROIRect;
```

REGIONS OF INTEREST FOR QUALITY ADJUSTMENTS

BACKGROUND

With the increased popularity of DVDs, music delivery over the Internet, and digital cameras, digital media have become commonplace. Engineers use a variety of techniques to process digital audio, video, and images efficiently while still maintaining quality. To understand these techniques, it helps to understand how the audio, video, and image information is represented and processed in a computer.

I. Representation of Media Information in a Computer

A computer processes media information as a series of numbers representing that information. For example, a single number may represent the intensity of brightness or the intensity of a color component such as red, green or blue for each elementary small region of a picture, so that the digital representation of the picture consists of one or more arrays of such numbers. Each such number may be referred to as a sample. For a color image, it is conventional to use more than one sample to represent the color of each elemental region, and typically three samples are used. The set of these samples for an elemental region may be referred to as a pixel, where the word "pixel" is a contraction referring to the concept of a "picture element." For example, one pixel may consist of three samples that represent the intensity of red, green and blue light necessary to represent the elemental region. Such a pixel type is referred to as an RGB pixel. Several factors affect quality of media information, including sample depth, resolution, and frame rate (for video).

Sample depth is a property normally measured in bits that indicates the range of numbers that can be used to represent a sample. When more values are possible for the sample, quality can be higher because the number can capture more subtle variations in intensity and/or a greater range of values. Resolution generally refers to the number of samples over some duration of time (for audio) or space (for images or individual video pictures). Images with higher resolution tend to look crisper than other images and contain more discernable useful details. Frame rate is a common term for temporal resolution for video. Video with higher frame rate tends to mimic the smooth motion of natural objects better than other video, and can similarly be considered to contain more detail in the temporal dimension. For all of these factors, the tradeoff for high quality is the cost of storing and transmitting the information in terms of the bit rate necessary to represent the sample depth, resolution and frame rate, as Table 1 shows.

TABLE 1

Bit rates for different quality levels of raw video

| Bits per pixel (sample depth times samples per pixel) | Resolution (pixels, Width × Height) | Frame rate (frames per second) | Bit rate (millions of bits per second) |
|---|---|---|---|
| 8 (value 0-255, monochrome) | 160 × 120 | 7.5 | 1.2 |
| 24 (value 0-255, RGB) | 320 × 240 | 15 | 27.6 |
| 24 (value 0-255, RGB) | 640 × 480 | 30 | 221.2 |
| 24 (value 0-255, RGB) | 1280 × 720 | 60 | 1327.1 |

Despite the high bit rate necessary for storing and sending high quality video (such as HDTV), companies and consumers increasingly depend on computers to create, distribute, and play back high quality content. For this reason, engineers use compression (also called source coding or source encoding) to reduce the bit rate of digital media. Compression decreases the cost of storing and transmitting the information by converting the information into a lower bit rate form. Compression can be lossless, in which quality of the video does not suffer but decreases in bit rate are limited by the complexity of the video. Or, compression can be lossy, in which quality of the video suffers but decreases in bit rate are more dramatic. Decompression (also called decoding) reconstructs a version of the original information from the compressed form. An encoder/decoder system is sometimes referred to as a "codec."

In general, video compression techniques include "intra" compression and "inter" or predictive compression. For video frames, intra compression techniques compress individual frames, typically called I-frames or key frames. Inter compression techniques compress frames with reference to preceding and/or following frames, and inter-compressed frames are typically called predicted frames, P-frames, or B-frames.

II. Inter and Intra Compression in Windows Media Video, Versions 8 and 9

Microsoft Corporation's Windows Media Video, Version 8 ("WMV8") includes a video encoder and a video decoder. The WMV8 encoder uses intra and inter compression, and the WMV8 decoder uses intra and inter decompression. Windows Media Video, Version 9 ("WMV9") uses a similar architecture for many operations.

A. Intra Compression

FIG. 1 illustrates block-based intra compression (100) of a block (105) of samples in a key frame in the WMV8 encoder. A block is a set of samples, for example, an 8×8 arrangement of samples. The WMV8 encoder splits a key video frame into 8×8 blocks and applies an 8×8 Discrete Cosine Transform ("DCT") (110) to individual blocks such as the block (105). A DCT is a type of frequency transform that converts the 8×8 block of samples (spatial information) into an 8×8 block of DCT coefficients (115), which are frequency information. The DCT operation itself is lossless or nearly lossless. Compared to the original sample values, however, the DCT coefficients are more efficient for the encoder to compress since most of the significant information is concentrated in low frequency coefficients (conventionally, the upper left of the block (115)) and many of the high frequency coefficients (conventionally, the lower right of the block (115)) have values of zero or close to zero.

The encoder then quantizes (120) the DCT coefficients, resulting in an 8×8 block of quantized DCT coefficients (125). Quantization is lossy. Since low frequency DCT coefficients tend to have higher values, quantization typically results in loss of precision but not complete loss of the information for the coefficients. On the other hand, since high frequency DCT coefficients tend to have values of zero or close to zero, quantization of the high frequency coefficients typically results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block of quantized DCT coefficients (125) for entropy encoding, which is a form of lossless compression. The exact type of entropy encoding can vary depending on whether a coefficient is a DC coefficient (lowest frequency), an AC coefficient (other frequencies) in the top row or left column, or another AC coefficient.

The encoder encodes the DC coefficient (126) as a differential from the DC coefficient (136) of a neighboring 8×8 block, which is a previously encoded neighbor (e.g., top or left) of the block being encoded. (FIG. 1 shows a neighbor block (135) that is situated to the left of the block being encoded in the frame.) The encoder entropy encodes (140) the differential.

The entropy encoder can encode the left column or top row of AC coefficients as a differential from a corresponding left column or top row of the neighboring 8×8 block. This is an example of AC coefficient prediction. FIG. 1 shows the left column (127) of AC coefficients encoded as a differential (147) from the left column (137) of the neighboring (in reality, to the left) block (135). The differential coding increases the chance that the differential coefficients have zero values. The remaining AC coefficients are from the block (125) of quantized DCT coefficients.

The encoder scans (150) the 8×8 block 145 of quantized AC DCT coefficients into a one-dimensional array (155) and then entropy encodes the scanned AC coefficients using a variation of run length coding (160). The encoder selects an entropy code from one or more run/level/last tables (165) and outputs the entropy code.

B. Inter Compression

Inter compression in the WMV8 encoder uses block-based motion compensated prediction coding followed by transform coding of the residual error. FIGS. 2 and 3 illustrate the block-based inter compression for a predicted frame in the WMV8 encoder. In particular, FIG. 2 illustrates motion estimation for a predicted frame (210) and FIG. 3 illustrates compression of a prediction residual for a motion-compensated block of a predicted frame.

For example, in FIG. 2, the WMV8 encoder computes a motion vector for a macroblock (215) in the predicted frame (210). To compute the motion vector, the encoder searches in a search area (235) of a reference frame (230). Within the search area (235), the encoder compares the macroblock (215) from the predicted frame (210) to various candidate macroblocks in order to find a candidate macroblock that is a good match. The encoder outputs information specifying the motion vector (entropy coded) for the matching macroblock. The motion vector is differentially coded with respect to a motion vector predictor.

The prediction is rarely perfect, so the encoder usually encodes blocks of differences (also called the error or residual blocks) between the prediction macroblock and the macroblock (215) itself.

FIG. 3 illustrates an example of computation and encoding of an error block (335) in the WMV8 encoder. The error block (335) is the difference between the predicted block (315) and the original current block (325). The encoder applies a DCT (340) to the error block (335), resulting in an 8×8 block (345) of coefficients. The encoder then quantizes (350) the DCT coefficients, resulting in an 8×8 block of quantized DCT coefficients (355). The encoder scans (360) the 8×8 block (355) into a one-dimensional array (365) such that coefficients are generally ordered from lowest frequency to highest frequency. The encoder entropy encodes the scanned coefficients using a variation of run length coding (370). The encoder selects an entropy code from one or more run/level/last tables (375) and outputs the entropy code.

FIG. 4 shows an example of a corresponding decoding process (400) for an inter-coded block. In summary of FIG. 4, a decoder decodes (410, 420) entropy-coded information representing a prediction residual using variable length decoding (410) with one or more run/level/last tables (415) and run length decoding (420). The decoder inverse scans (430) a one-dimensional array (425), storing the entropy-decoded information into a two-dimensional block (435). The decoder inverse quantizes and inverse DCTs (together, 440) the data, resulting in a reconstructed error block (445). In a separate motion compensation path, the decoder computes a predicted block (465) using motion vector information (455) for displacement from a reference frame. The decoder combines (470) the predicted block (465) with the reconstructed error block 445 to form the reconstructed block (475). An encoder also performs the inverse quantization, inverse DCT, motion compensation and combining to reconstruct frames for use as reference frames.

III. Lossy Compression and Quantization

The preceding section mentioned quantization, a mechanism for lossy compression, and lossless compression. Lossless compression reduces the bit rate of information by removing redundancy from the information without any reduction in fidelity. Lossless compression techniques reduce bit rate at no cost to quality, but can only reduce bit rate up to a certain point. Decreases in bit rate are limited by the inherent amount of variability in the statistical characterization of the input data, which is referred to as the source entropy.

In contrast, with lossy compression, the quality suffers somewhat but the achievable decrease in bit rate is more dramatic. Lossy compression techniques can be used to reduce bit rate more than lossless compression techniques, but some of the reduction in bit rate is achieved by reducing quality, and the lost quality cannot be completely recovered. Lossy compression is often used in conjunction with lossless compression—e.g., in a system design in which lossy compression establishes an approximation of the information and lossless compression techniques are applied to represent the approximation.

According to one possible definition, quantization is a term used for an approximating non-reversible mapping function commonly used for lossy compression, in which there is a specified set of possible output values, and each member of the set of possible output values has an associated set of input values that result in the selection of that particular output value. In general, an encoder varies quantization to trade off quality and bit rate. Coarser quantization results in greater quality reduction but allows for greater bit rate reduction.

A variety of quantization techniques have been developed, including scalar or vector, uniform or non-uniform, and adaptive or non-adaptive quantization.

A. Scalar Quantizers

According to one possible definition, a scalar quantizer is an approximating functional mapping $x \rightarrow Q[x]$ of an input value x to a quantized value Q[x], sometimes called a reconstructed value. FIG. 5 shows a "staircase" I/O function (500) for a scalar quantizer. The horizontal axis is a number line for a real number input variable x, and the vertical axis indicates the corresponding quantized values Q[x]. The number line is partitioned by thresholds such as the threshold (510). Each value of x within a given range between a pair of adjacent thresholds is assigned the same quantized value Q[x]. For example, each value of x within the range (520) is assigned the same quantized value (530). (At a threshold, one of the two possible quantized values is assigned to an input x, depending on the system.) Overall, the quantized values Q[x] exhibit a discontinuous, staircase pattern. The distance the mapping continues along the number line depends on the system, typically ending after a finite number of thresholds. The placement of the thresholds on the number line may be uniformly spaced (as shown in FIG. 5) or non-uniformly spaced.

A scalar quantizer can be decomposed into two distinct stages. The first stage is the classifier stage, in which a classifier function mapping $x \rightarrow A[x]$ maps an input x to a quantization index A[x], which is often integer-valued. In essence, the classifier segments an input number line or data set. FIG.

6A shows a generalized classifier (600) and thresholds for a scalar quantizer. As in FIG. 5, a number line for a real number variable x is segmented by thresholds such as the threshold (610). Each value of x within a given range such as the range (620) is assigned the same quantized value Q[x]. FIG. 6B shows a numerical example of a classifier (650) and thresholds for a scalar quantizer.

In the second stage, a reconstructor functional mapping k→β[k] maps each quantization index k to a reconstruction value β[k]. In essence, the reconstructor places steps having a particular height relative to the input number line segments (or selects a subset of data set values) for reconstruction of each region determined by the classifier. The reconstructor functional mapping may be implemented, for example, using a lookup table. Overall, the classifier relates to the reconstructor as follows:

$$Q[x]=\beta[A[x]] \quad (1).$$

In common usage, the term "quantization" is often used to describe the classifier stage, which is performed during encoding. The term "inverse quantization" is similarly used to describe the reconstructor stage, whether performed during encoding or decoding.

The distortion introduced by using such a quantizer may be computed with a difference-based distortion measure d(x−Q[x]). Typically, such a distortion measure has the property that d(x−Q[x]) increases as x−Q[x] deviates from zero; and typically each reconstruction value lies within the range of the corresponding classification region, so that the straight line that would be formed by the functional equation Q[x]=x will pass through every step of the staircase diagram (as shown in FIG. 5) and therefore Q[Q[x]] will typically be equal to Q[x]. In general, a quantizer is considered better in rate-distortion terms if the quantizer results in a lower average value of distortion than other quantizers for a given bit rate of output. More formally, a quantizer is considered better if, for a source random variable X, the expected (i.e., the average or statistical mean) value of the distortion measure $\bar{D}=E_X\{d(X-Q[X])\}$ is lower for an equal or lower entropy H of A[X]. The most commonly-used distortion measure is the squared error distortion measure, for which $d(|x-y|)=|x-y|^2$. When the squared error distortion measure is used, the expected value of the distortion measure ($\bar{D}$) is referred to as the mean squared error.

B. Dead Zone+Uniform Threshold Quantizers

A non-uniform quantizer has threshold values that are not uniformly spaced for all classifier regions. According to one possible definition, a dead zone plus uniform threshold quantizer ("DZ+UTQ") is a quantizer with uniformly spaced threshold values for all classifier regions except the one containing the zero input value (which is called the dead zone ("DZ")). In a general sense, a DZ+UTQ is a non-uniform quantizer, since the DZ size is different than the other classifier regions.

A DZ+UTQ has a classifier index mapping rule x→A[x] that can be expressed based on two parameters. FIG. 7 shows a staircase I/O function (700) for a DZ+UTQ, and FIG. 8A shows a generalized classifier (800) and thresholds for a DZ+UTQ. The parameter s, which is greater than 0, indicates the step size for all steps other than the DZ. Mathematically, all $s_i$ are equal to s for i≠0. The parameter z, which is greater than or equal to 0, indicates the ratio of the DZ size to the size of the other steps. Mathematically, $s_0$=z·s. In FIG. 8A, z is 2, so the DZ is twice as wide as the other classification zones. The index mapping rule x→A[x] for a DZ+UTQ can be expressed as:

$$A[x] = \text{sign}(x) * \max\left(0, \left\lfloor \frac{|x|}{s} - \frac{z}{2} + 1 \right\rfloor\right), \quad (2)$$

where $\lfloor \cdot \rfloor$ denotes the smallest integer less than or equal to the argument and where sign(x) is the function defined as:

$$\text{sign}(x) = \begin{cases} +1 & \text{for } x \geq 0, \\ -1 & \text{for } x < 0. \end{cases} \quad (3)$$

FIG. 8B shows a numerical example of a classifier (850) and thresholds for a DZ+UTQ with s=1 and z=2. FIGS. 5, 6A, and 6B show a special case DZ+UTQ with z=1. Quantizers of the UTQ form have good performance for a variety of statistical sources. In particular, the DZ+UTQ form is optimal for the statistical random variable source known as the Laplacian source.

In some system designs (not shown), an additional consideration may be necessary to fully characterize a DZ+UTQ classification rule. For practical reasons there may be a need to limit the range of values that can result from the classification function A[x] to some reasonable finite range. This limitation is referred to as clipping. For example, in some such systems the classification rule could more precisely be defined as:

$$A[x] = \text{sign}(x) * \min\left[g, \max\left(0, \left\lfloor \frac{|x|}{s} - \frac{z}{2} + 1 \right\rfloor\right)\right], \quad (4)$$

where g is a limit on the absolute value of A[x].

Different reconstruction rules may be used to determine the reconstruction value for each quantization index. Standards and product specifications that focus only on achieving interoperability will often specify reconstruction values without necessarily specifying the classification rule. In other words, some specifications may define the functional mapping k→β[k] without defining the functional mapping x→A[x]. This allows a decoder built to comply with the standard/specification to reconstruct information correctly. In contrast, encoders are often given the freedom to change the classifier in any way that they wish, while still complying with the standard/specification.

Numerous systems for adjusting quantization thresholds have been developed. Many standards and products specify reconstruction values that correspond to a typical mid-point reconstruction rule (e.g., for a typical simple classification rule) for the sake of simplicity. For classification, however, the thresholds can in fact be adjusted so that certain input values will be mapped to more common (and hence, lower bit rate) indices, which makes the reconstruction values closer to optimal.

In many systems, the extent of quantization is measured in terms of quantization step size. Coarser quantization uses larger quantization step sizes, corresponding to wider ranges of input values. Finer quantization uses smaller quantization step sizes. Often, for purposes of signaling and reconstruction, quantization step sizes are parameterized as multiples of a smallest quantization step size.

C. Quantization Artifacts

As mentioned above, lossy compression tends to cause a decrease in quality. For example, a series of ten samples of slightly different values can be approximated using quantization as ten samples with exactly the same particular approximate value. This kind of quantization can reduce the bit rate of encoding the series of ten samples, but at the cost of lost detail in the original ten samples.

In some cases, quantization produces visible artifacts that tend to be more artificial-looking and visually distracting than simple loss of fine detail. For example, smooth, un-textured content is susceptible to contouring artifacts—artifacts that appear between regions of two different quantization output values—because the human visual system is sensitive to subtle variations (particularly luma differences) in smooth content. Using the above example, consider a case where the luma values of the series of ten samples change gradually and consistently from the first sample to the tenth sample. Quantization may approximate the first five sample values as one value and the last five sample values as another value. While this kind of quantization may not create visible artifacts in textured areas due to masking effects, in smooth regions it can create a visible line or step in the reconstructed image between the two sets of five samples.

IV. Differential Quantization in VC-1

In differential quantization, an encoder varies quantization step sizes (also referred to herein as quantization parameters or QPs) for different parts of a picture. Typically, this involves varying QPs on a macroblock level or other sub-picture level. The encoder makes decisions on how to vary the QPs, and signals those decisions, as appropriate, to a decoder.

For example, a VC-1 encoder optionally chooses differential quantization for compression. The encoder sends a bitstream element (DQUANT) at a syntax level above picture level to indicate whether or not the QP can vary among the macroblocks in individual pictures. The encoder sends a picture-level bitstream element, PQINDEX, to indicate a picture QP. If DQUANT=0, the QP indicated by PQINDEX is used for all macroblocks in the picture. If DQUANT=1 or 2, different macroblocks in the same picture can use different QPs.

The VC-1 encoder can use more than one approach to differential quantization. In one approach, only two different QPs are used for a picture. This is referred to as bi-level differential quantization. For example, one QP is used for macroblocks at picture edges and another QP is used for macroblocks in the rest of the picture. This can be useful for saving bits at picture edges, where fine detail is less important for maintaining overall visual quality. Or, a 1-bit value signaled per macroblock indicates which of two available QP values to use for the macroblock. In another approach, referred to as multi-level differential quantization, a larger number of different QPs can be used for individual macroblocks in a picture.

The encoder sends a picture-level bitstream element, VOP-DQUANT, when DQUANT is non-zero. VOPDQUANT is composed of other elements, potentially including DQPROFILE, which indicates which parts of the picture can use QPs other than the picture QP. When DQPROFILE indicates that arbitrary, different macroblocks can use QPs other than the picture QP, the bitstream element DQBILEVEL is present. If DQBILEVEL=1, each macroblock uses one of two QPs (bi-level quantization). If DQBILEVEL=0, each macroblock can use any QP (multi-level quantization).

The bitstream element MQDIFF is sent at macroblock level to signal a 1-bit selector for a macroblock for bi-level quantization. For multi-level quantization, MQDIFF is a three-bit element (taking a value from 0 to 7). If MQDIFF is not 7 (i.e., if the difference between the picture QP and the macroblock QP is 6 or less), MQDIFF indicates a differential between the picture QP and the macroblock QP. If MQDIFF is 7, an absolute QP is signaled by the 5-bit element ABSMQ for a macroblock.

V. Other Standards and Products

Numerous international standards specify aspects of video decoders and formats for compressed video information. Directly or by implication, these standards also specify certain encoder details, but other encoder details are not specified. Some standards address still image compression/decompression, and other standards address audio compression/decompression. Numerous companies have produced encoders and decoders for audio, still images, and video. Various other kinds of signals (for example, hyperspectral imagery, graphics, text, financial information, etc.) are also commonly represented and stored or transmitted using compression techniques.

Various video standards allow the use of different quantization step sizes for different picture types, and allow variation of quantization step sizes for rate and quality control. Standards typically do not fully specify the quantizer design.

Given the critical importance of video compression to digital video, it is not surprising that video compression is a richly developed field. Whatever the benefits of previous video compression techniques, however, they do not have the advantages of the following techniques and tools.

SUMMARY

The present application describes techniques and tools for adjusting quality settings (e.g., quantization parameters) for regions of interest. For example, the perceptual quality of video is improved by allowing a user to identify regions of interest that specify quantization adjustments for corresponding parts of video pictures.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, a region of interest is identified for a video picture. Typically, the video picture is comprised of units such as macroblocks, and the region of interest corresponds to a subset of macroblocks in the picture. Initial region-of-interest encoding settings established by a video encoder (e.g., quantization step sizes for macroblocks corresponding to the region of interest) are adjusted relative to encoder settings for other parts of the video picture, by changing the region-of-interest settings and/or the encoder settings for other parts of the picture. The adjustment is based at least in part on region-of-interest information associated with the region of interest. The region-of-interest information includes, for example, dead zone information and quantization step size information. Quantization step sizes and/or dead zone sizes can be reduced (to improve visual quality) or increased (to reduce bit rate). The region of interest can be identified and quality adjustment information can be provided based on input received from a user interface (e.g., graphical user interface, command line interface, eye tracking device, etc.).

In another aspect, plural regions of interest include a first region of interest that overlaps at least in part with a second region of interest. An overlap quantization setting is determined for a portion of the picture that corresponds to the overlap. For example, the overlap quantization setting is determined to be the smaller of a quantization step size for the first region of interest and a quantization step size for the second region of interest. Or, the overlap quantization setting is chosen from a relative reduction in quantization step size for the first region of interest and a relative reduction in quantization step size for the second region of interest.

In another aspect, a region of interest is parameterized by information that indicates the spatial dimensions of the region of interest and region-of-interest settings. For example, information indicating the region-of-interest settings includes dead zone information, quantization step size information, and/or quantization mode information.

The foregoing and other objects, features, and advantages will become more apparent from the following detailed description, which proceeds with reference to the accompanying figures.

DETAILED DESCRIPTION

The present application relates to techniques and tools for quality adjustments (e.g., quantization adjustments in video pictures) using regions of interest. In various described embodiments, a video encoder incorporates techniques for encoding video, and corresponding signaling techniques for use with a bitstream format or syntax comprising different layers or levels. Some of the described techniques and tools can be applied to interlaced or progressive frames.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific macroblock formats, other formats also can be used.

The various techniques and tools can be used in combination or independently. Different embodiments implement one or more of the described techniques and tools. Some techniques and tools described herein can be used in a video encoder, or in some other system not specifically limited to video encoding.

I. Computing Environment

Figure 1:
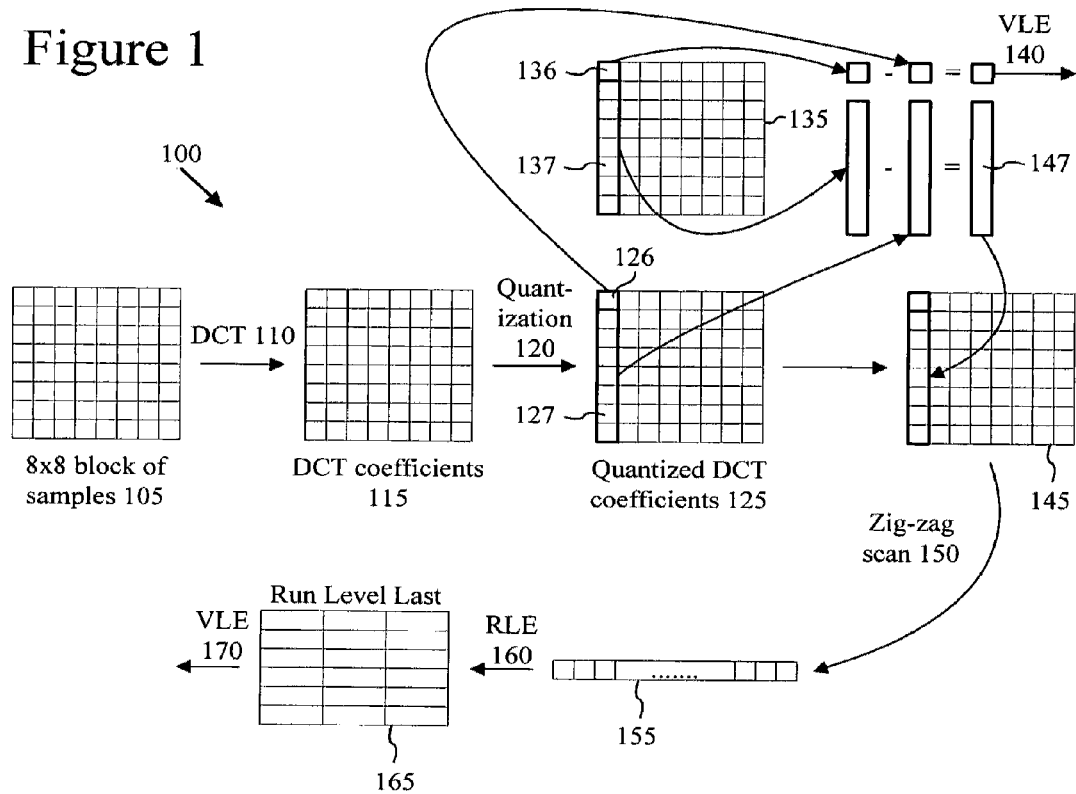
FIG. 1 is a diagram showing block-based intraframe compression of an 8×8 block of samples.
Figure 2:
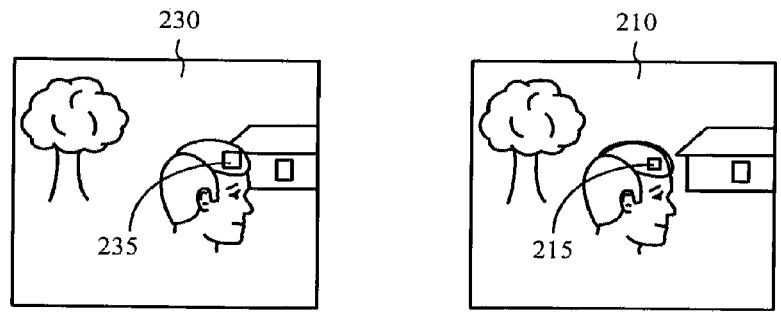
FIG. 2 is a diagram showing motion estimation in a video encoder.
Figure 3:
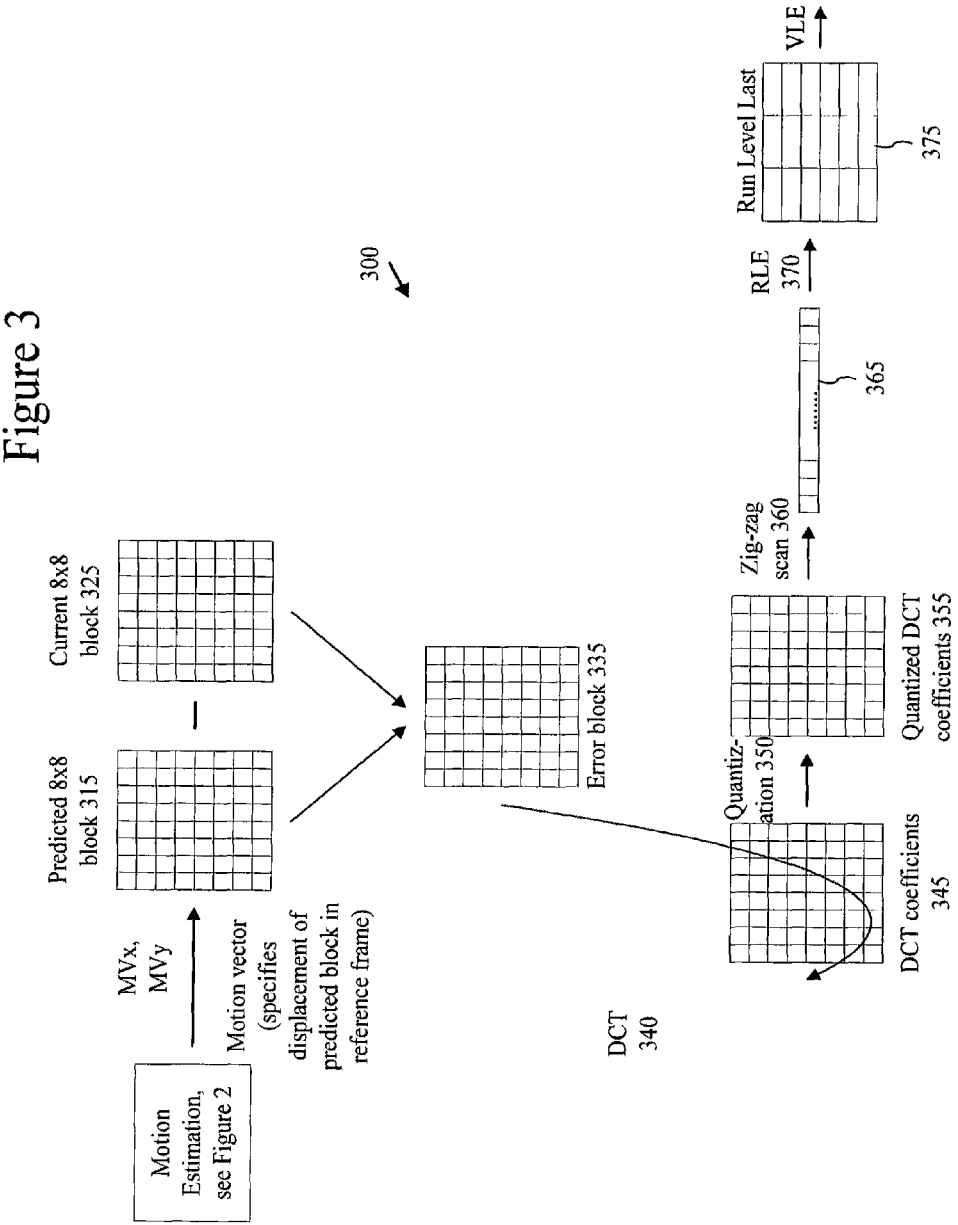
FIG. 3 is a diagram showing block-based compression for an 8×8 block of prediction residuals in a video encoder.
Figure 4:
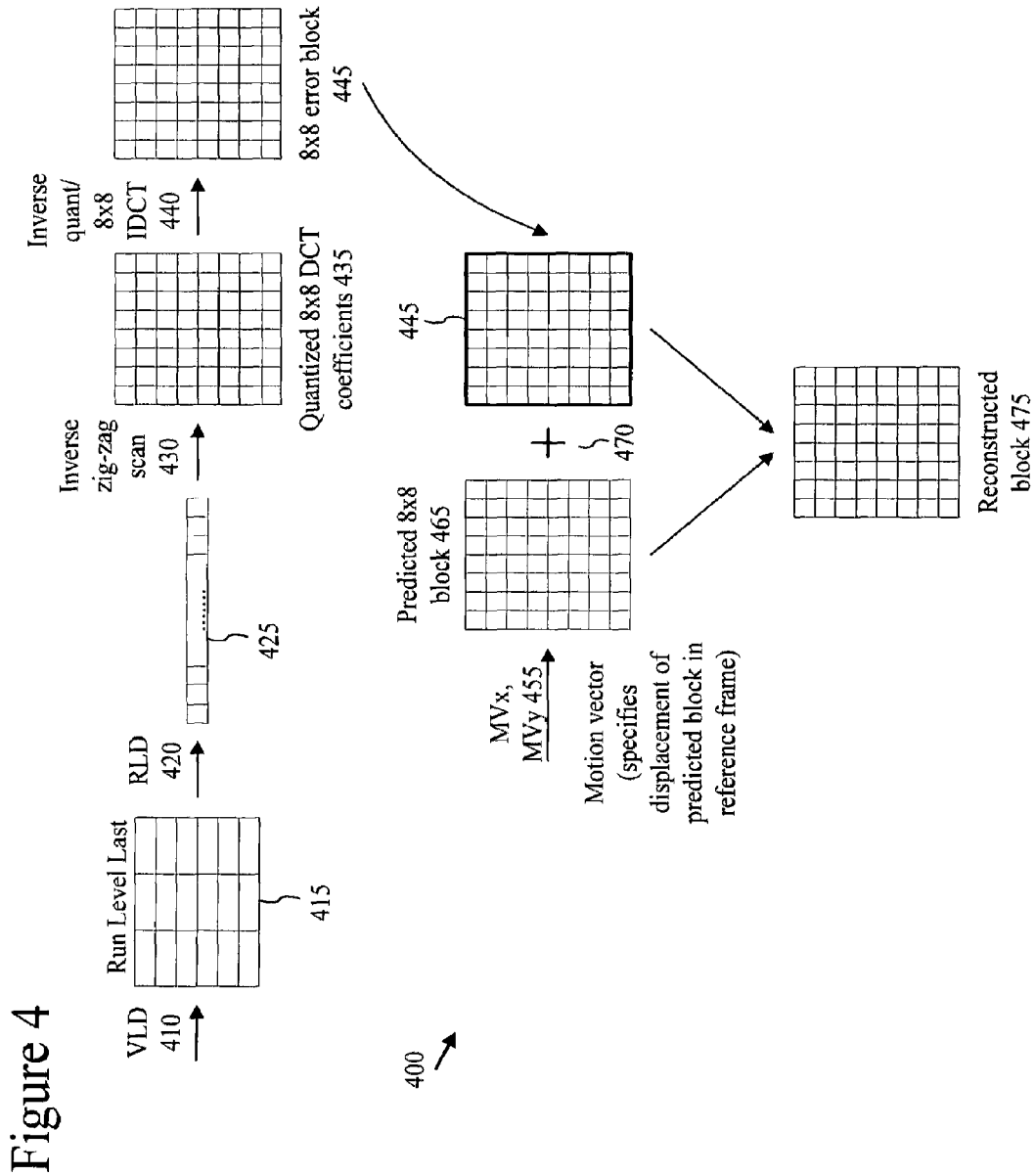
FIG. 4 is a diagram showing block-based decompression for an 8×8 block of prediction residuals in a video decoder.
Figure 5:
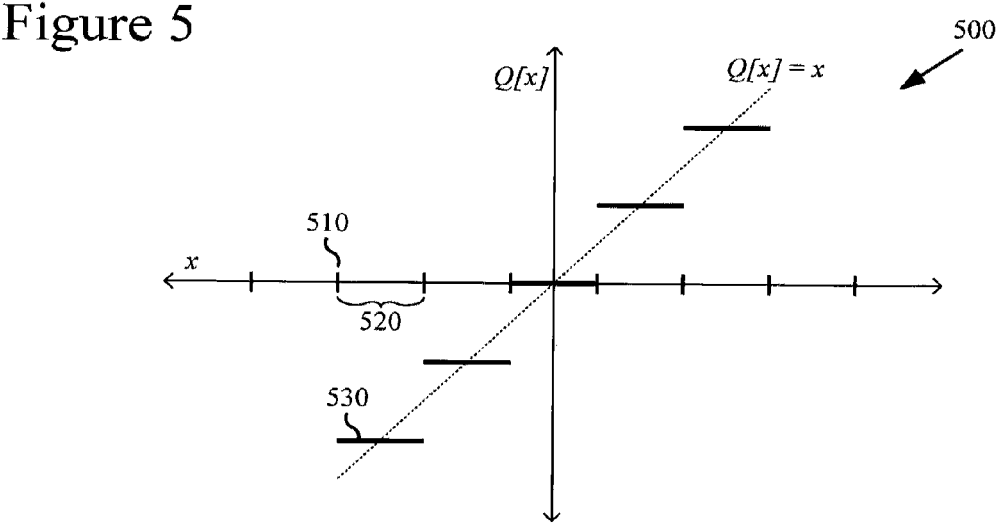
FIG. 5 is a chart showing a staircase I/O function for a scalar quantizer.
Figure 6A:
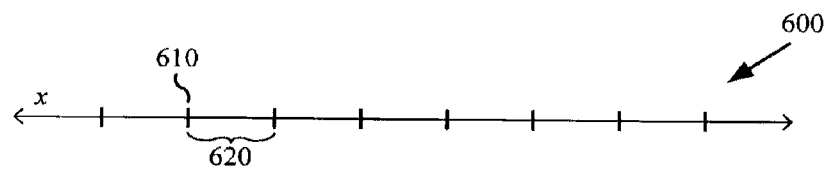
FIGS. 6A and 6B are charts showing classifiers and thresholds for scalar quantizers.
Figure 6B:
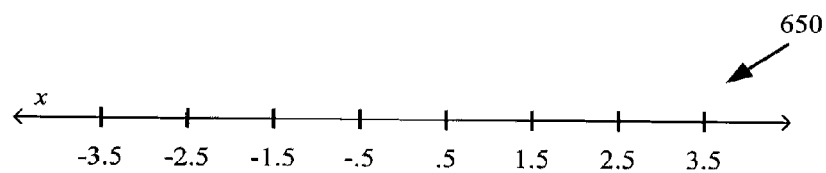
Figure 7:
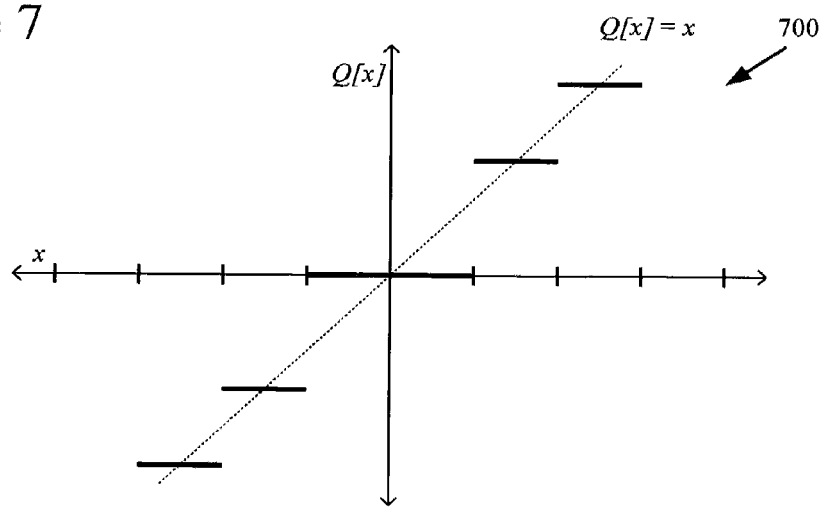
FIG. 7 is a chart showing a staircase I/O function for a DZ+UTQ.
Figure 8A:
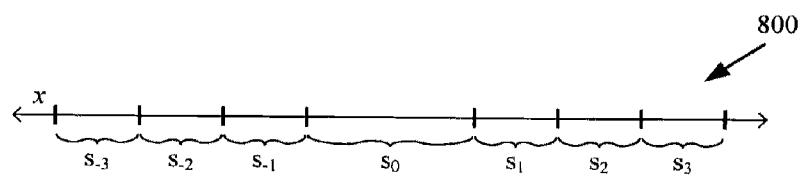
FIGS. 8A and 8B are charts showing classifiers and thresholds for DZ+UTQs.
Figure 8B:
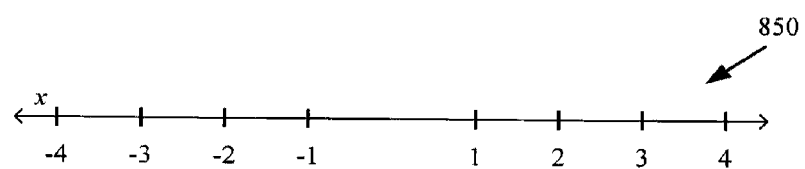
Figure 9:
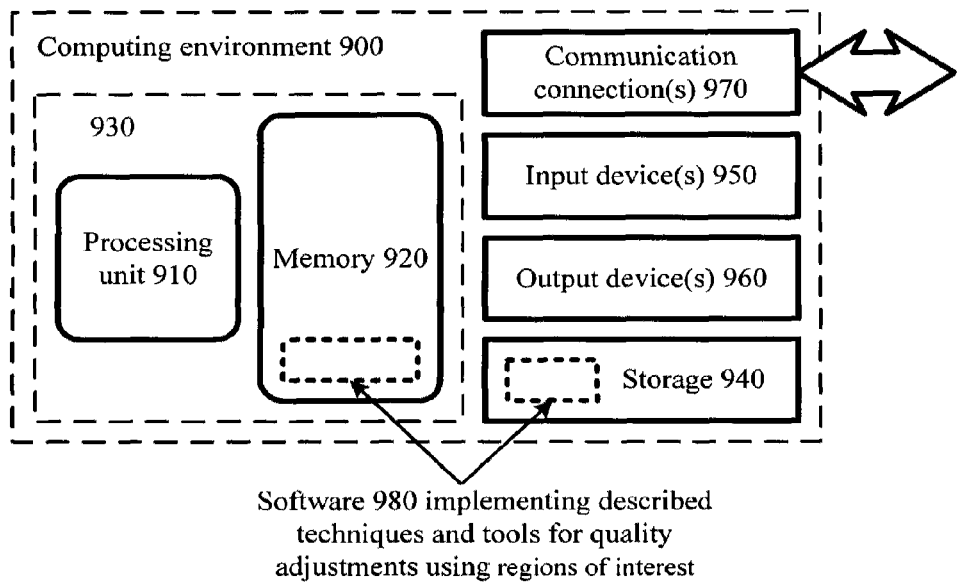
FIG. 9 is a block diagram of a suitable computing environment in conjunction with which several described embodiments may be implemented.

FIG. 9 illustrates a generalized example of a suitable computing environment (900) in which several of the described embodiments may be implemented. The computing environment (900) is not intended to suggest any limitation as to scope of use or functionality, as the techniques and tools may be implemented in diverse general-purpose or special-purpose computing environments.

With reference to FIG. 9, the computing environment (900) includes at least one processing unit (910) and memory (920). In FIG. 9, this most basic configuration (930) is included within a dashed line. The processing unit (910) executes computer-executable instructions and may be a real or a virtual processor. In a multi-processing system, multiple processing units execute computer-executable instructions to increase processing power. The memory (920) may be volatile memory (e.g., registers, cache, RAM), non-volatile memory (e.g., ROM, EEPROM, flash memory, etc.), or some combination of the two. The memory (920) stores software (980) implementing a video encoder or post-encoding application with one or more of the described techniques and tools for making quality adjustments using regions of interest.

A computing environment may have additional features. For example, the computing environment (900) includes storage (940), one or more input devices (950), one or more output devices (960), and one or more communication connections (970). An interconnection mechanism (not shown) such as a bus, controller, or network interconnects the components of the computing environment (900). Typically, operating system software (not shown) provides an operating environment for other software executing in the computing environment (900), and coordinates activities of the components of the computing environment (900).

The storage (940) may be removable or non-removable, and includes magnetic disks, magnetic tapes or cassettes, CD-ROMs, DVDs, or any other medium which can be used to store information and which can be accessed within the computing environment (900). The storage (940) stores instructions for the software (980).

The input device(s) (950) may be a touch input device such as a keyboard, mouse, pen, or trackball, a voice input device, a scanning device, or another device that provides input to the computing environment (900). For audio or video encoding, the input device(s) (950) may be a sound card, video card, TV tuner card, or similar device that accepts audio or video input in analog or digital form, or a DVD, CD-ROM or CD-RW that reads audio or video samples into the computing environment (900). The output device(s) (960) may be a display, printer, speaker, DVD- or CD-writer, or another device that provides output from the computing environment (900).

The communication connection(s) (970) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (900), computer-readable media include memory (920), storage (940), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "receive" and "obtain" to describe computer operations in a computing environment. These terms are high-level abstractions for operations performed by a computer, and should not be confused with acts performed by a human being. The actual computer operations corresponding to these terms vary depending on implementation.

II. Generalized Video Encoder

Figure 10:
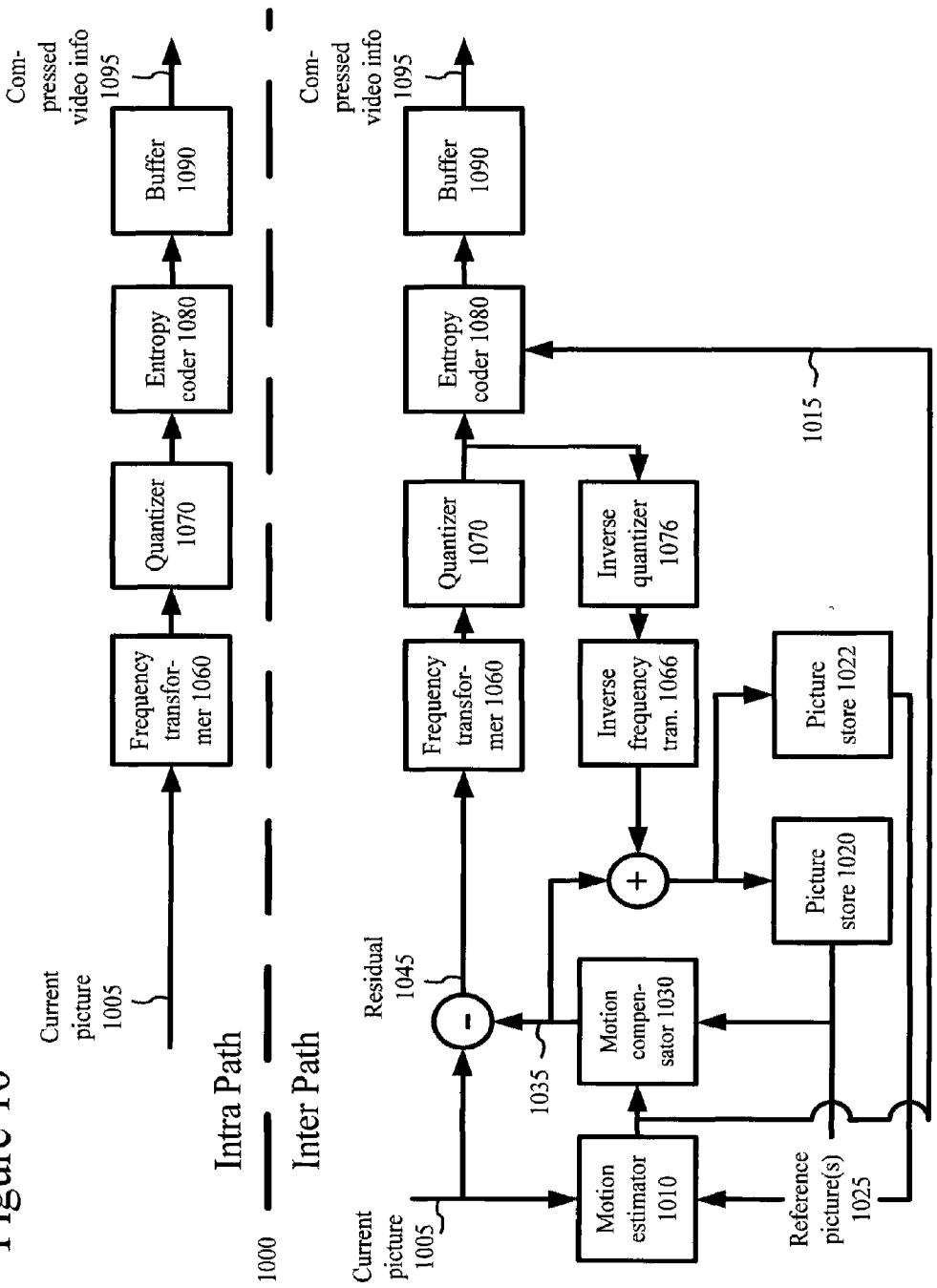
FIG. 10 is a block diagram of a generalized video encoder system in conjunction with which several described embodiments may be implemented.

FIG. 10 is a block diagram of a generalized video encoder (1000) in conjunction with which some described embodiments may be implemented. The encoder (1000) receives a sequence of video pictures including a current picture (1005) and produces compressed video information (1095) as output to storage, a buffer, or a communication connection. The format of an output bitstream can be an elementary stream that complies with one or more video codec standards such as VC-1 (SMPTE 421M), MPEG-x (e.g., MPEG-1, MPEG-2, or MPEG-4), H.26x (e.g., H.261, H.262, H.263, or H.264), or other format.

Figure 11:
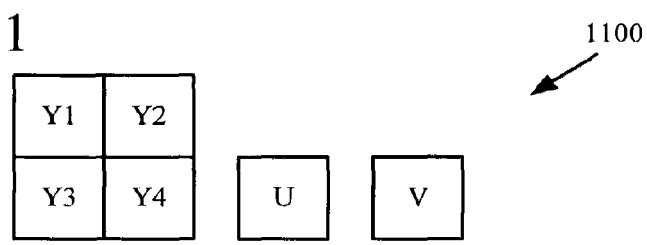
FIG. 11 is a diagram of a macroblock format used in several described embodiments.

The encoder (1000) processes video pictures. The term picture generally refers to source, coded or reconstructed image data. For progressive video, a picture is a progressive video frame. For interlaced video, a picture may refer to an interlaced video frame, the top field of the frame, or the bottom field of the frame, depending on the context. The encoder (1000) is block-based and uses a 4:2:0 macroblock format for frames. As shown in FIG. 11, macroblock (1100) includes four 8×8 luminance (or luma) blocks (Y1 through Y4) and two 8×8 chrominance (or chroma) blocks (U and V) that are co-located with the four luma blocks but half resolution horizontally and vertically, following the conventional 4:2:0 macroblock format. For fields, the same or a different macroblock organization and format may be used. The 8×8 blocks may be further sub-divided at different stages, e.g., at the frequency transform and entropy encoding stages. The encoder (1000) can perform operations on sets of samples of different size or configuration than 8×8 blocks and 16×16 macroblocks. Alternatively, the encoder (1000) is object-based or uses a different macroblock or block format.

Returning to FIG. 10, the encoder system (1000) compresses predicted pictures and intra-coded, key pictures. For the sake of presentation, FIG. 10 shows a path for key pictures through the encoder system (1000) and a path for predicted pictures. Many of the components of the encoder system (1000) are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction (or difference) from one or more other pictures (which are typically referred to as reference pictures or anchors). A prediction residual is the difference between what was predicted and the original picture. In contrast, a key picture (e.g., progressive I-frame, interlaced I-field, or interlaced I-frame) is compressed without reference to other pictures.

If the current picture (1005) is a predicted picture, a motion estimator (1010) estimates motion of macroblocks or other sets of samples of the current picture (1005) with respect to one or more reference pictures, for example, the reconstructed previous picture (1025) buffered in the picture store (1020). If the current picture (1005) is a bi-predictive picture, a motion estimator (1010) estimates motion in the current picture (1005) with respect to up to four reconstructed reference pictures (for an interlaced B-field, for example). Typically, a motion estimator estimates motion in a B-picture with respect to one or more temporally previous reference pictures and one or more temporally future reference pictures, but B-pictures need not be predicted from different temporal directions. The encoder system (1000) can use the separate stores (1020, 1022) for multiple reference pictures.

The motion estimator (1010) can estimate motion by full-sample, ½-sample, ¼-sample, or other increments, and can switch the precision of the motion estimation on a picture-by-picture basis or other basis. The motion estimator (1010) (and compensator (1030)) also can switch between types of reference picture sample interpolation (e.g., between bicubic and bilinear) on a per-frame or other basis. The precision of the motion estimation can be the same or different horizontally and vertically. The motion estimator (1010) outputs as side information motion information (1015) such as differential motion vector information. The encoder (1000) encodes the motion information (1015) by, for example, computing one or more predictors for motion vectors, computing differentials between the motion vectors and predictors, and entropy coding the differentials. To reconstruct a motion vector, a motion compensator (1030) combines a predictor with differential motion vector information.

The motion compensator (1030) applies the reconstructed motion vector to the reconstructed picture(s) (1025) to form a motion-compensated current picture (1035). The prediction is rarely perfect, however, and the difference between the motion-compensated current picture (1035) and the original current picture (1005) is the prediction residual (1045). During later reconstruction of the picture, the prediction residual (1045) is added to the motion compensated current picture (1035) to obtain a reconstructed picture that is closer to the original current picture (1005). In lossy compression, however, some information is still lost from the original current picture (1005). Alternatively, a motion estimator and motion compensator apply another type of motion estimation/compensation.

A frequency transformer (1060) converts the spatial domain video information into frequency domain (i.e., spectral) data. For block-based video pictures, the frequency transformer (1060) applies a DCT, variant of DCT, or other block transform to blocks of the sample data or prediction residual data, producing blocks of frequency transform coefficients. Alternatively, the frequency transformer (1060) applies another conventional frequency transform such as a Fourier transform or uses wavelet or sub-band analysis. The frequency transformer (1060) may apply an 8×8, 8×4, 4×8, 4×4 or other size frequency transform.

A quantizer (1070) then quantizes the blocks of spectral data coefficients. The quantizer applies uniform, scalar quantization to the spectral data with a step-size that varies on a picture-by-picture basis or other basis (e.g., a macroblock-by-macroblock basis). Alternatively, the quantizer applies another type of quantization to the spectral data coefficients, for example, a non-uniform, vector, or non-adaptive quantization, or directly quantizes spatial domain data in an encoder system that does not use frequency transformations. Techniques and tools relating to quantization in some implementations are described in detail below.

In addition to adaptive quantization, the encoder (1000) can use frame dropping, adaptive filtering, or other techniques for rate control.

When a reconstructed current picture is needed for subsequent motion estimation/compensation, an inverse quantizer (1076) performs inverse quantization on the quantized spectral data coefficients. An inverse frequency transformer (1066) then performs the inverse of the operations of the frequency transformer (1060), producing a reconstructed prediction residual (for a predicted picture) or a reconstructed key picture. If the current picture (1005) was a key picture, the reconstructed key picture is taken as the reconstructed current picture (not shown). If the current picture (1005) was a predicted picture, the reconstructed prediction residual is added to the motion-compensated current picture (1035) to form the reconstructed current picture. One or both of the picture stores (1020, 1022) buffers the reconstructed current picture for use in motion compensated prediction. In some embodiments, the encoder applies a de-blocking filter to the reconstructed frame to adaptively smooth discontinuities and other artifacts in the picture.

The entropy coder (1080) compresses the output of the quantizer (1070) as well as certain side information (e.g., motion information (1015), quantization step size (QP)). Typical entropy coding techniques include arithmetic coding, differential coding, Huffman coding, run length coding, LZ coding, dictionary coding, and combinations of the above. The entropy coder (1080) typically uses different coding techniques for different kinds of information (e.g., DC coefficients, AC coefficients, different kinds of side information), and can choose from among multiple code tables within a particular coding technique. The encoder (1000) may use special signaling for a skipped macroblock, which is a macroblock that has no information of certain types (e.g., no differential motion vectors for the macroblock and no residual information).

The entropy coder (1080) provides compressed video information (1095) to the buffer (1090). A buffer level indicator may be fed back to a controller. Before or after the buffer (1090), the compressed video information (1095) can be channel coded for transmission over the network. The channel coding can apply error detection and correction data to the compressed video information (1095).

A controller (not shown) receives inputs from various modules such as the motion estimator (1010), frequency transformer (1060), quantizer (1070), inverse quantizer (1076), entropy coder (1080), and buffer (1090). The controller evaluates intermediate results during encoding, for example, estimating distortion and performing other rate-distortion analysis. The controller works with modules such as the motion estimator (1010), frequency transformer (1060), quantizer (1070), and entropy coder (1080) to set and change coding parameters during encoding. When an encoder evaluates different coding parameter choices during encoding, the encoder may iteratively perform certain stages (e.g., quantization and inverse quantization) to evaluate different parameter settings. The encoder may set parameters at one stage before proceeding to the next stage. Or, the encoder may jointly evaluate different coding parameters. The tree of coding parameter decisions to be evaluated, and the timing of corresponding encoding, depends on implementation.

The encoder (1000) may include one or more modules for using regions of interest to adjust encoder settings. For example, the encoder can allow a user to preview video after quantization or other encoding stages and draw regions of interest to indicate areas for quality adjustment. Alternatively, region-of-interest adjustments can be made after the encoder (1000) outputs encoded video. Techniques and tools relating to quality adjustments using regions of interest are described in detail below.

The relationships shown between modules within the encoder (1000) indicate general flows of information in the encoder; other relationships are not shown for the sake of simplicity. In particular, FIG. 10 usually does not show side information indicating the encoder settings, modes, tables, etc. used for a video sequence, picture, macroblock, block, etc. Such side information, once finalized, is sent in the output bitstream, typically after entropy encoding of the side information.

Particular embodiments of video encoders typically use a variation or supplemented version of the generalized encoder (1000). Depending on implementation and the type of compression desired, modules of the encoder can be added, omitted, split into multiple modules, combined with other modules, and/or replaced with like modules. For example, the controller can be split into multiple controller modules associated with different modules of the encoder. In alternative embodiments, encoders with different modules and/or other configurations of modules perform one or more of the described techniques.

III. Differential Quantization and Texture Information

In differential quantization, an encoder varies quantization step sizes (also referred to herein as quantization parameters or QPs in some implementations) for different parts of a picture. Typically, this involves varying QPs on a macroblock or other sub-picture level. An encoder makes decisions on how to vary the QPs and can signal those decisions, as appropriate, to a decoder. Some encoders use bi-level differential quantization (varying between two QPs) and multi-level differential quantization (varying between three or more QPs). For example, in one bi-level differential quantization approach, one QP is used for macroblocks at picture edges and another QP is used for macroblocks in the rest of the picture. This can be useful for saving bits at picture edges, where fine detail is less important for maintaining overall visual quality. In a multi-level differential quantization approach, a larger number of different QPs can be used for individual macroblocks in a picture. For example, an encoder can choose a QP for a macroblock and signal a differential between the QP for the current picture and the QP for the macroblock.

Some encoders use texture-based differential quantization to allocate bits based on various texture levels to achieve better perceptual quality. In texture-based differential quantization, different QPs are chosen to code video based on texture information and, in some cases, based on other information such as temporal analysis information. An encoder analyzes texture information (and possibly other information) and applies texture-based differential quantization to appropriate areas, such as 8×8 blocks or macroblocks in a picture. Texture-based differential quantization may focus on areas having particular kinds of content, such as smooth areas or areas of perceptually important detail (e.g., text). Smooth areas include flat areas of constant or nearly constant color and gradient slope areas (areas of color that vary at a constant or nearly constant rates). Smooth areas may be interrupted by small areas of noise, film grains, or other color variations.

Figure 12A:
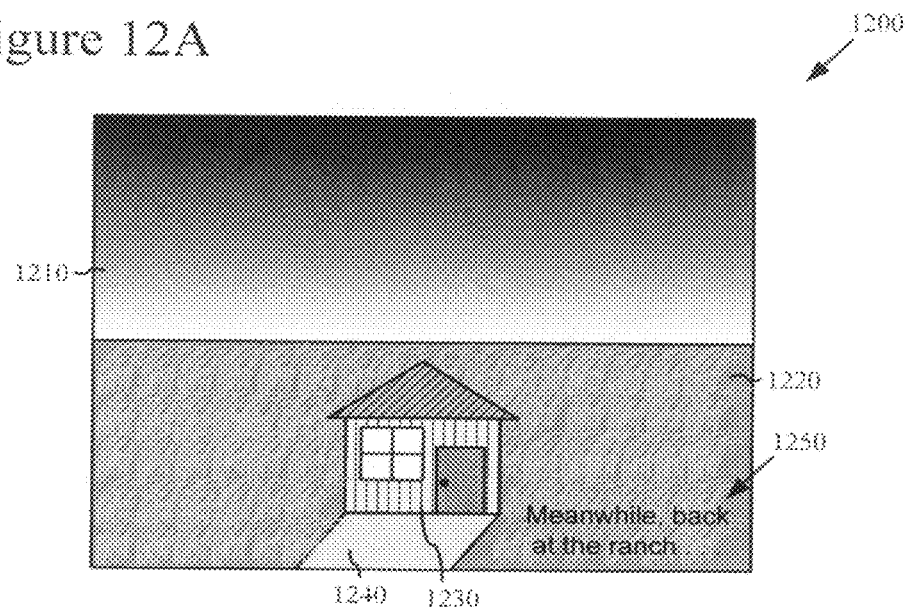
FIG. 12A is a diagram showing an example frame with a gradient slope area, a textured area, a sharp-edge area, a flat area and a text area.

Perceptual sensitivity to quantization artifacts is highly related to the texture level of the video in both the spatial and temporal domain. FIG. 12A is a diagram showing an example picture (1200) with different texture levels. The example picture (1200) includes a gradient slope area (1210), a textured area (1220), a sharp-edge area (1230), a flat area (1240), and a text area (1250). High texture levels (e.g., textured area (1220) have details that often result in masking effects that can hide quality degradation and quantization artifacts. However, in areas with lower texture levels (e.g., smooth areas such as the gradient slope area (1210) and the flat area (1240)), degradation and quantization artifacts are more likely to be visible. Furthermore, quantization in areas with text overlays (e.g., the text area (1250)) or sharp edges (e.g., the sharp edge area (1230)) can result in noise or blurring around edges.

Figure 12B:
FIG. 12B is a diagram showing a contouring artifact in the gradient slope area of FIG. 12A.
Figure 12C:
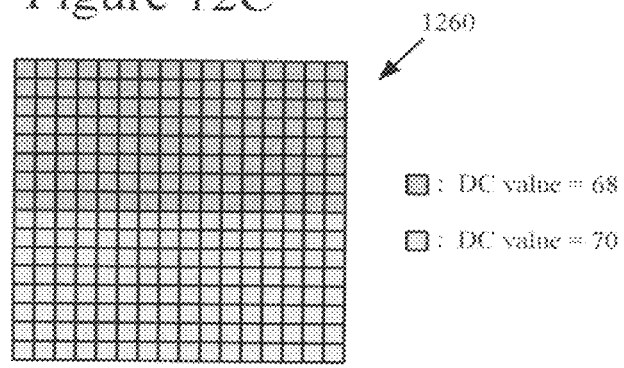
FIG. 12C shows macroblock-level detail of a contouring artifact of FIG. 12B.

A common visual artifact caused by quantization in smooth areas is contouring. Contouring artifacts are typically perceived by human eyes as structured, gradient discontinuities in what are otherwise continuous, very smooth areas such as sky, water, etc. Such discontinuities can be very distracting and may lead a human observer to conclude that a whole picture is badly distorted even if other parts of the picture are coded with little visual distortion. FIG. 12B is a diagram showing results of quantization in the gradient slope area (1210). The banding effect that is now visible (e.g., within macroblock (1260)) is a contour artifact. FIG. 12C shows detail of the macroblock (1260). Quantization of transform coefficients for the top half of the luma samples in macroblock (1260) results in uniform values stemming from a DC value of 68. Quantization of transform coefficients for the bottom half of the luma samples in macroblock (1260) results in uniform values stemming from the DC value of 70. Thus, the quantization of the transform coefficients for the luma samples has created a visible contour artifact between the top-half 8×8 blocks and the bottom-half 8×8 blocks in macroblock (1260).

Figure 13:
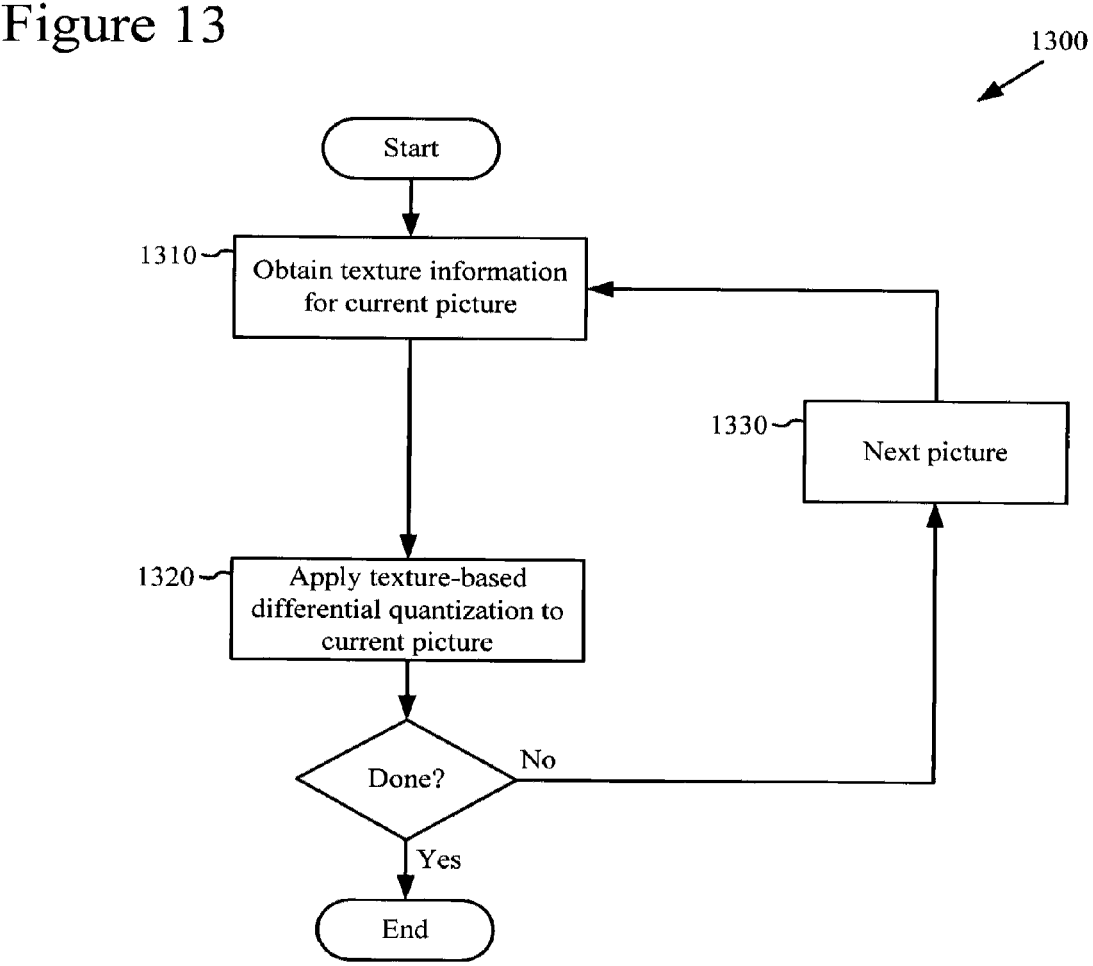
FIG. 13 is a flow chart showing a generalized technique for applying differential quantization based on texture information.

FIG. 13 is a flow chart showing a generalized technique (1300) for applying differential quantization based on texture information. An encoder such as the encoder (1000) of FIG. 10 or other tool performs the technique (1300).

Referring to FIG. 13, an encoder obtains (1310) texture information (e.g., information that indicates whether different areas are smooth, edge, or texture areas) for a current picture. The encoder applies (1320) texture-based differential quantization to the picture. For example, smooth areas are coded with smaller QPs than high texture areas. If there are more pictures to encode, the encoder takes the next picture (1330) and selectively applies texture-based differential quantization to the next picture, as appropriate. The encoder outputs encoded data for the video picture, for example, to storage, a communication connection, or a buffer.

Different texture detection techniques can be used to determine how an area should be treated. For example, an encoder can use different texture metrics and/or different texture thresholds (and can adjust thresholds adaptively) to determine how a particular part of a picture should be treated (e.g., as smooth, textured, text, or edge). For more information, see U.S. patent application Ser. No. 11/400,788, entitled "Quantization Adjustment Based on Texture Level," filed Apr. 7, 2006, the disclosure of which is incorporated herein by reference, and U.S. patent application Ser. No. 11/400,739, entitled "Gradient Slope Detection for Video Compression," filed Apr. 7, 2006, the disclosure of which is incorporated herein by reference.

IV. Encoder Quality Adjustment Using Regions of Interest

Although encoding tools such as texture-based differential quantization can be effective in many scenarios, they may not be perfect. For example, in texture-based differential quantization, areas of high texture with text overlays within them may be classified as high texture and quantized at a level that is appropriate for high texture. As a result, perceptually important detail in the text overlay may be lost or distorted. For example, referring again to FIG. 12A, detail in the text overlay (1250) in the high-texture area (1220) could be distorted if high-texture quantization is applied on or near the text overlay (1250). Other processes meant to provide better video quality also may not be effective enough to remove distracting visual artifacts from the encoded video.

Accordingly, described techniques and tools use regions of interest ("ROIs") in video pictures to allow greater flexibility in adjusting encoder settings (such as quantization settings) and potentially improve quality and/or bit rate of compressed video. For example, ROIs can be used to allow a different quality of encoding (e.g., reduced quantization step size, reduced dead zone ("DZ") sizes, or some other adjustment) in the regions of interest. In this section, techniques and tools are described for defining ROIs and for adjusting encoding parameters associated with ROIs.

Described embodiments can include one or more of the following features:
1. One or more ROIs, with one or more adjustable encoding parameters for each ROI, can be used in individual pictures. In one implementation, up to nine regions of interest per picture are supported. ROIs can be defined as rectangular areas (typically a collection of macroblocks or other sub-picture units such as 8×8 blocks) of a picture. Alternatively, an arbitrary-shaped collection of macroblocks or other sub-picture units can be used. The spatial area corresponding to an ROI can remain fixed for multiple pictures. Or, an ROI can move or be redefined from picture to picture (e.g., a collection macroblocks corresponding to the face of an actor can move from picture to picture as that actor moves in the field of view of the camera).
2. Adjustable encoding parameters include adjustable differential QPs, adjustable quantization dead zones, adjustable filtering parameters, and/or some other adjustable encoding parameter.

The described techniques and tools can be used with any video encoder (e.g., a VC-1 video encoder, an H.264/JVT video encoder, or an encoder that complies with some other existing video codec standard) or some other encoder not specifically limited to video encoding.

Techniques and tools described herein can be used by a video encoder or a separate application that modifies encoding settings for compressed video. Region-of-interest encoding settings can be specified prior to encoding, during various stages of encoding, or during re-encoding of an encoded bitstream.

A. Quantization Adjustment Using Regions of Interest

Techniques and tools described herein can be used by a video encoder or a separate application that modifies quantization settings for compressed video. For example, ROIs are defined and quantization is adjusted based on the ROIs (e.g., to improve visual quality in the ROIs while raising bit rate, or to reduce bit rate while reducing visual quality in the ROIs).

Figure 14:
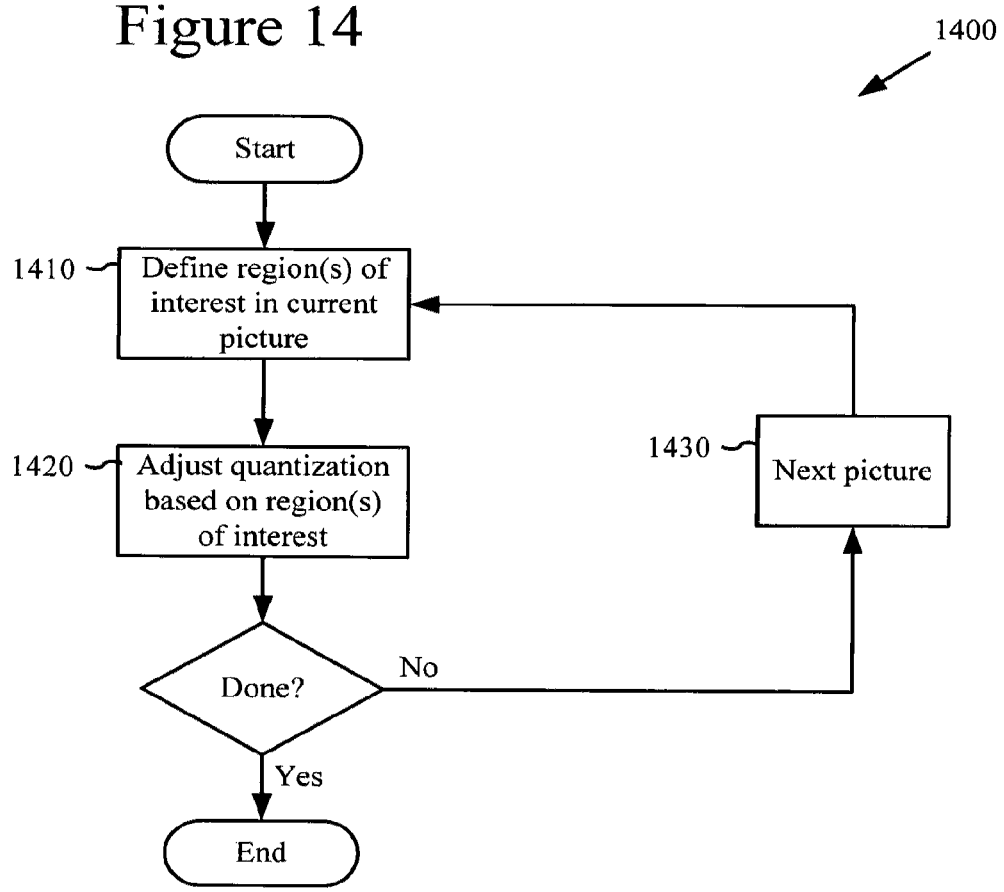
FIG. 14 is a flow chart showing a generalized technique for defining regions of interest in video pictures and adjusting quantization based at least in part on the regions of interest.

FIG. 14 is a flow chart showing a generalized technique (1400) for adjusting quantization in one or more regions of interest. An encoder such as the encoder (1000) of FIG. 10 or other tool performs the technique (1400).

Figures 15, 16:
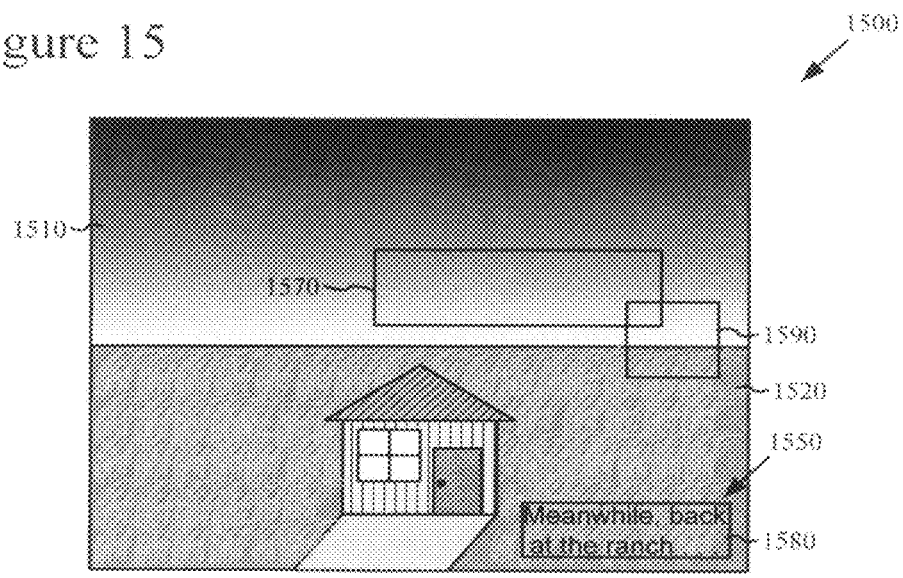
FIG. 15 is a diagram showing an example frame with a gradient slope area, a region of interest in the gradient slope area, a text area, and a region of interest that covers the text area.
FIG. 16 is a code diagram showing pseudocode for a region of interest data structure.

Referring to FIG. 14, one or more ROIs are defined (1410) in a video picture for which quantization has been or will be performed. The ROIs can be defined by a user (e.g., through a graphical user interface that allows the user to draw, drag-and-drop, or otherwise define boundaries of the ROIs). Alternatively, ROIs can be defined automatically (e.g., by the encoder (1000) based on texture information or locations of quantization artifacts), which can then be provided to a user for review and approval. Referring to FIG. 15, for a current picture (1500) having a gradient slope area (1510), a textured area (1520), and a text area (1550), one ROI (1570) covers part of the gradient slope area (1510) and another ROI (1580) covers the text area (1550). ROIs also can cover parts of different kinds of texture areas. For example, a third ROI (1590) covers part of the gradient slope area (1510) and part of the textured area (1520).

In one implementation, the parts of the picture to be adjusted include blocks or macroblocks partially or completed covered by ROIs (1570, 1580, 1590), and the ROIs (1570, 1580, 1590) need not be block-aligned or macroblock-aligned. Alternatively, ROIs (1570, 1580, 1590) are macrolock-aligned or block-aligned.

Referring again to FIG. 14, the encoder adjusts (1420) quantization in the regions of interest. For the example of FIG. 15, quantization step sizes can be adjusted up (to reduce quality in the ROIs (1570, 1580, 1590) while reducing bit rate) or down (to improve quality in the ROIs (1570, 1580, 1590) while increasing bit rate). An encoder can adjust the quantization step size to a pre-designated level (e.g., QP=1) or adjust the quantization step size by a predetermined amount (e.g., subtracting two steps from the QP) in the ROIs (1570, 1580, 1590). Or, the encoder can adjust the quantization step size based on input from a user (e.g., using a quantization step size defined by the user).

In FIG. 15, two ROIs (1570, 1590) overlap. In one implementation, a quantization step size for the overlap area is determined by taking the lowest quantization step size (or the greatest relative reduction in quantization step size) specified by the individual overlapping ROIs (e.g., 1570, 1590). For example, if the ROI (1570) in the gradient slope area specifies a QP of 1 and the ROI (1590) specifies a QP of 2, the QP for the overlap area is set to be 1. As another example, if the ROI (1570) in the gradient slope area specifies that the QP of each macroblock should be reduced by 1 and the ROI (1590) specifies that the QP of each macroblock corresponding to that ROI should be reduced by 2, the QP for the macroblocks corresponding to the overlap area will be reduced by 2. Alternatively, other rules can be used for overlapping ROIs.

Quantization information for the adjusted picture can be represented using differential quantization. For example, an encoder can use bi-level differential quantization or multi-level differential quantization. In addition to adjusting quantization step sizes, an encoder can adjust dead zone sizes or some other aspect of quantization for content covered by the ROIs (1570, 1580, 1590). If there are more pictures to analyze, the encoder processes the next picture (1430).

In some cases, the encoder signals information indicating differential quantization settings or other settings for use by a decoder during reconstruction of encoded content. In other cases, the encoder uses the adjusted settings during encoding only, not signaling information about the adjusted settings. For example, if an encoder adjusts dead zone size or adjusts how filtering is performed for a ROI relative to other parts of a video picture, but does so in a way that does not affect the reconstruction rules followed by a decoder during decoding, the encoder does not signal information indicating the adjusted settings. This might happen if dead zone size is incrementally widened or narrowed for content in a ROI, or for content outside the ROI relative to the ROI. Or, it might happen if content in a ROI is more aggressively filtered, or less aggressively filtered, than other parts of a picture in pre-processing.

B. Example Approach for Region-of-Interest Differential Quantization and Dead Zone Adjustments This section describes an example approach for using ROIs to adjust quantization in video pictures. Principles and data structures described herein also can be used to make other kinds of adjustments for encoded video. Although specific techniques and data structures are described in this section, it should be understood that regions of interest can be defined using other techniques and/or data structures.

Figure 17:
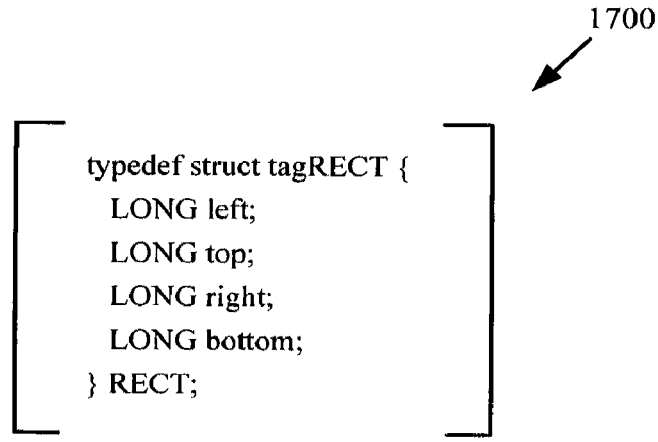
FIG. 17 is a code diagram showing pseudocode for a rectangle data structure used in the region of interest data structure of FIG. 16.

FIG. 16 is a code diagram showing pseudocode (1600) for a region of interest data structure in one implementation, in which ROIs are specified as rectangular collections of macroblocks. Descriptions of the example fields shown in pseudocode (1600) are provided below.

roi_rect makes use of the RECT structure, which is shown in pseudocode (1700) in FIG. 17. RECT defines the coordinates of the upper-left and lower-right corners of a rectangle.

qp_mode is a mode parameter that takes the values 0 or 1, where 0 represents an absolute QP (not relative to a frame QP) mode and 1 represents a relative QP mode. The value of qp_mode indicates whether an absolute QP or a differential QP is specified by I_qp, P_qp, or B_qp.

I_qp represents a QP for an ROI in an I-frame. In this example, the legal range of I_qp is [−31, −30, −29, . . . , 29, 30, 31]. Referring to the pseudocode (1600), when qp_mode is 0 and I_qp is greater than or equal to 1, the I_qp value is the absolute QP used for the ROI. If qp_mode is 0 and I_qp is less than or equal to 0, the ROI inherits the frame's QP value. When qp_mode is 1, I_qp gives the differential between the ROI QP and the current frame QP. Thus, the sum of frame QP and I_qp (frame QP+I_qp) is the QP used for the ROI. In this example, the sum of frame QP and I_qp is constrained to be in the legal QP range of [1, . . . , 31]

P_qp represents a QP for an ROI in a P-frame. In this example, the legal range of P_qp is [−31, −30, −29, . . . , 29, 30, 31]. When qp_mode is 0 and P_qp is greater than or equal to 1, the P_qp value is the absolute QP used for the ROI. If qp_mode is 0 and P_qp is less than or equal to 0, the ROI inherits the frame's QP value. When qp_mode is 1, P_qp gives the differential between the ROI QP and the current frame QP. Thus, the sum of frame QP and P_qp (frame QP+P_qp) is the QP used for the ROI. In this example, the sum of frame QP and P_qp is constrained to be in the legal QP range of [1, . . . , 31].

B_qp represents a QP for an ROI in a B-frame. In this example, the legal range of B_qp is [−31, −30, −29, . . . , 29, 30, 31]. When qp_mode is 0 and B_qp is greater than or equal to 1, the B_qp value is the absolute QP used for the ROI. If qp_mode is 0 and B_qp is less than or equal to 0, the ROI inherits the frame's QP value. When qp_mode is 1, B_qp gives the differential between the ROI QP and the current frame QP. Thus, the sum of frame QP and B_qp (frame QP+B_qp) is the QP used for the ROI. In this example, the sum of frame QP and B_qp is constrained to be in the legal QP range of [1, . . . , 31].

Other legal ranges for I_qp/P_qp/B_qp and the sums of frame QP and I_qp/P_qp/B_qp are possible in other implementations that allow greater or lesser variation or different granularity in quantization step sizes for ROIs or on a picture level. In one implementation, for example, when bi-level differential quantization is used the frame QP can take half-step values (e.g., the legal range of frame QP is [1, 1.5, 2, 2.5, . . . , 31]) while differential QPs are limited to integer values, and when multi-level differential quantization is used both frame QPs and differential QPs are limited to integer values.

In general, if qp_mode is 0 and I_qp/P_qp/B_qp is non-zero and positive, the encoder will take the value of I_qp/P_qp/B_qp to determine the QP to be applied to the ROI (e.g., all macroblocks covered or partially covered by the ROI). This allows control of bit usage for different purposes. For example, if a default quantization process produces poor visual quality within an ROI, using a lower QP can improve perceptual quality. As another example, if a default quantization process uses more bits than are necessary for some area of a current picture, a higher (i.e., coarser) QP can be set for an ROI covering the area to save bits. The ROI can specify more aggressive quantization adjustments (e.g., by raising or lowering QPs more aggressively) in order to achieve even better quality or lower bit usage.

Alternatively, qp_mode and I_qp/P_qp/B_qp values can be used to tell to an encoder to assign best quality to the ROI, rather than an absolute QP or differential QP. For example, particular values of qp_mode and I_qp/P_qp/B_qp can be reserved to signal that a lowest permissible QP for the picture is used for the ROI.

roi_option takes one of four values, as shown in Table 2, below. roi_option indicates types of pictures to which the ROI settings (e.g., QP or dead zone settings) should be applied. In this example, the roi_option field specifies which picture types use quantization settings specified by the ROI.

TABLE 2 roi_option values and corresponding meanings

| Value of roi_option | Meaning |
| --- | --- |
| 0 | Use default settings for different picture types. |
| 1 | Use ROI settings only on I pictures. |
| 2 | Use ROI settings only on I and P pictures. |
| 3 | Use ROI settings only on I, P and B pictures. |

The default option (roi_option=0) allows an ROI to inherit picture-level quantization decisions, such that picture-level encoder parameters determine whether differential quantization is enabled for a given picture based on its type (e.g., I, P or B). The non-zero roi_option values indicate that quantization settings are to be modified by quantization information corresponding to the ROI. Option 1 indicates that ROI quantization is applied only for I-pictures. Option 2 indicates that ROI quantization is applied only for I-pictures and P-pictures. Option 3 indicates that ROI quantization is applied for I-pictures, P-pictures and B-pictures. Alternatively, ROI quantization can be applied to only P-pictures, only B-pictures, B-pictures and P-pictures, or some other subset of pictures. As another alternative, the roi_option field can be used in other ROI data structures designed for adjusting different encoder decisions (e.g., loop filtering, overlap filtering, etc.) to specify which picture types should have the respective encoder decisions adjusted for the ROI. As another alternative, information typically represented by roi_option is implied or provided in some other way.

ROIs also can be used to adjust quantization dead zones. In one implementation, ROIs inherit picture-level dead zone behavior by default, but dead zone information (e.g., dead zone size) can be adjusted for ROIs. For example, a specific ROI dead zone size can be changed for an ROI.

Referring again to FIG. 16, intra_deadzone is a dead zone parameter for intra blocks in the ROI. In this example, the legal range for intra_deadzone is [0, . . . , 30]. (Other legal ranges are possible in other implementations that, for example, allow greater variation in dead zone parameters). In one implementation, the actual dead zone value for intra blocks is one-tenth of the intra_deadzone value, times the QP value for the intra blocks. For example, if intra_deadzone is 15, the actual dead zone value used in quantization by the encoder is 1.5*QP. An intra_deadzone value of 0 is a special case and means that the frame-level dead zone parameter is used for the ROI. Different dead zone sizes can be used for different purposes. For example, in one implementation a lower dead zone value of 10 for intra blocks (translating to a dead zone size of 1.0*QP) can provide improved visual quality if the regular dead zone size used in quantization is 1.2*QP. A larger value of 30 (translating to a dead zone size of 3.0*QP) can save some bits at a cost of increased distortion if the regular dead zone size used in quantization is 2.4*QP; such an adjustment may be appropriate in picture areas where distortion is less visible (e.g., highly textured areas).

inter_deadzone is a dead zone parameter for inter blocks in the ROI. In this example, the legal range for inter_deadzone is [0, . . . , 70]. (Other legal ranges are possible in other implementations that, for example, allow greater variation in dead zone parameters). In one implementation, the actual dead zone value for inter blocks is one-tenth of the inter_deadzone value, times the QP value for the intra blocks. For example, if inter_deadzone is 15, the actual dead zone value used by the encoder during quantization is 1.5*QP. An inter_deadzone value of 0 is a special case and means that the frame-level dead zone parameter is used for the ROI.

Multiple ROIs can be specified for individual pictures. In many cases, using multiple regions of interest for adjustment of quantization within a picture will result in multiple QPs used in the picture, if the picture does not already use more than one QP.

Figure 18:
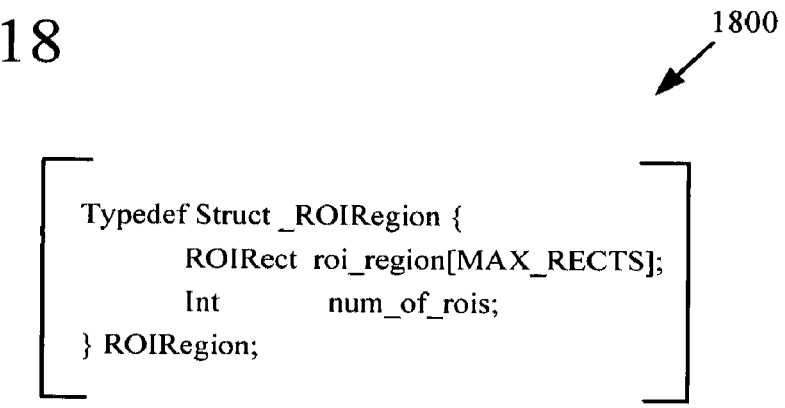
FIG. 18 is a code diagram showing pseudocode for a data structure used in defining multiple regions of interest.

FIG. 18 is a code diagram showing pseudocode (1800) specifying a set of ROIs. The set of ROIs can be applied to a set of one or more video pictures (e.g., a scene comprising consecutive pictures) to be encoded. The data structure _ROIRegion includes an array (roi_region [MAX_RECTS]) of up to a specified number of ROIs. _ROIRegion also includes the field num_of_rois, which specifies the number of ROIs for the data structure.

In one implementation that allows multiple ROIs for individual pictures, ROIs are allowed to overlap, and the overlap areas are treated differently than the non-overlapping areas. Blocks covered by more than one overlapping ROI use the lowest QP and smallest dead zone specified by the overlapping ROIs. Alternatively, overlapping ROI areas are treated in some other way, such as by averaging the settings specified by the overlapping ROIs.

When an ROI is used to change a quantization setting, if the quality of the region is different than bordering areas of the picture, the boundary between the ROI and the rest of the picture may be visible. For example, if an ROI specifies a QP of 2 and the rest of the picture is quantized with a QP of 6, a visible edge may be present at the borders of the ROI. The adverse visual effects of such edges can be reduced by using intermediate QPs at border areas to blend the lower-QP ROI and the higher-QP parts of the picture, or to blend the higher-QP ROI and the lower-QP parts of the picture.

Some encoders apply differential QPs on a block-by-block basis. Described techniques and tools can be used to perform QP adjustments, dead zone adjustments, and/or other adjustments for blocks that are covered by an ROI.

Other kinds of quantization adjustment can be specified by an ROI. For example, quantization adjustments based on texture level and quantization adjustments to preserve non-zero AC coefficients (to help reduce quantization artifacts) can be performed for ROIs.

C. Signaling Considerations and Selection of Picture-Level QP

In some embodiments, certain types of adjusted ROI encoder settings do not have corresponding information signaled in an encoded content bit stream. For example, adjustments to dead zone size (wider, narrower), other incremental adjustments to quantization bin thresholds, adjustments to pre-encoder filtering (more aggressive, less aggressive), or other changes that affect encoding but not reconstruction performed by an encoder or decoder, need not have corresponding information signaled. Other types of adjusted ROI encoder settings, such as adjusted quantization step sizes, typically do have corresponding information signaled in an encoded content bit stream.

In general, lower signaling overhead for quantization information is desirable to reduce bit rate for encoded video. In some encoders, signaling of multiple QPs within a current picture is tied to the picture-level QP (sometimes referred to as a frame QP) in a differential quantization scheme. Choosing a QP that is appropriate for a given picture can help reduce the number of bits needed for signaling QPs for macroblocks in the picture when differential quantization is used.

In an example encoder, the bitstream element MQDIFF is used to signal a one-bit selector at macroblock level for bi-level quantization. For multi-level quantization, MQDIFF is a three-bit element (taking a value from 0 to 7). If MQDIFF is not 7 (i.e., if the macroblock QP is less than or equal to the frame QP+6), MQDIFF indicates a differential between the picture QP and the macroblock QP. If MQDIFF is 7, an absolute QP is signaled by the five-bit element ABSMQ for a macroblock. Thus, for QP differences greater than 6 in multi-level quantization, eight bits are used to signal the QP for the macroblock.

For this example encoder, a frame QP can be chosen such that the amount of bits needed to signal QP information for macroblocks is minimized. The signaling overhead for a given picture having a given frame QP (FQP) in one implementation can be found according to the following equation:

$$SignalBits(FQP) = \sum_{MQP=1}^{FQP-1} Histo(MQP)*8 + \sum_{MQP=FQP}^{FQP+6} Histo(MQP)*3 + \sum_{MQP=FQP+7}^{MAXQP} Histo(MQP)*8$$

where MQP represents a QP for an individual macroblock, MAXQP represents the maximum QP for any macroblock in the picture, and $\Sigma$ Histo(MQP) represents the total number of macroblock QPs in the given range.

The sums of Histo(MQP) are fixed given that Histo(MQP) is fixed. To minimize SignalBits(FQP), FQP can be found such that $$\sum_{MQP=FQP}^{FQP+6} Histo(MQP)*3$$

(representing the QP differences that require only three bits to encode in the example encoder) is maximized.

All possible frame QPs do not need be analyzed to select a frame QP. For example, rather than calculating SignalBits for all possible frame QPs, a sliding window can be used to calculate the biggest moving average of the sum. For example, using a sliding window of 7, the first frame QP in the sliding window having the biggest moving average can be chosen as the frame QP.

Frame QPs can be chosen for other encoders such that signaling overhead is minimized. For example, the calculations can be adjusted depending on signaling overhead in other encoders for particular macroblock QPs.

D. Other Uses for Regions of Interest

Other encoder settings can be adjusted with ROIs, in addition to (or instead of) the quantization adjustments described above. For example, noise filtering, loop filtering, overlap filtering, and other settings can be adjusted using ROIs. If a filter setting is effective for most of a picture, but not for particular areas, ROIs can be defined to cover the particular areas to adjust the filter settings. As another example, ROIs can be used to remap sample values (e.g., luma values and chroma values) in particular areas of a picture. When used for correct reconstruction, such adjusted ROI encoding settings are signaled.

Having described and illustrated the principles of our invention with reference to various described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:
1. A method comprising:
  identifying a region of interest for a video picture, wherein the region of interest corresponds to a first part of the video picture having plural units, wherein the plural units of the first part of the video picture each have an initial encoding setting established by a video encoder; and
  adjusting the initial encoding setting for at least one of the plural units of the first part of the video picture relative to encoder settings for other parts of the video picture, wherein the adjusting is based at least in part on region- of-interest information associated with the region of interest, wherein the region of interest is identified based at least in part on input received from a user interface, the region-of-interest information comprising:

at least one dead zone parameter including at least one of inter and intra block dead zone information; and quantization step size information;

encoding the video picture using the adjusted encoding setting.

2. The method of claim 1 wherein the plural units are macroblocks.

3. The method of claim 1 wherein the plural units are 8×8 blocks.

4. The method of claim 1 wherein the initial encoding setting established by the video encoder comprises an initial quantization step size, and wherein the adjusted encoding setting comprises a quantization step size that is smaller than the initial quantization step size.

5. The method of claim 1 wherein the initial encoding setting established by the video encoder comprises an initial quantization step size, wherein the adjusted encoding setting comprises a quantization step size that is larger than the initial quantization step size.

6. The method of claim 5 wherein the larger quantization step size reduces bit rate of the at least one unit of the first part of the video picture.

7. The method of claim 1 wherein the initial encoding setting established by the video encoder comprises an initial dead zone size, and wherein the adjusted encoding setting comprises a dead zone size that is smaller than the initial dead zone size.

8. The method of claim 1 wherein the initial encoding setting established by the video encoder comprises an initial dead zone size, wherein the adjusted encoding setting comprises a dead zone size that is larger than the initial dead zone size.

9. The method of claim 8 wherein the larger dead zone size reduces bit rate of the at least one unit of the first part of the video picture.

10. A method comprising:

identifying a region of interest for a video picture, wherein the region of interest specifies a first part of the video picture having plural units, and wherein the plural units of the first part of the video picture each have an initial encoding setting established by a video encoder; and adjusting the initial encoding setting for at least one of the plural units of the first part of the video picture relative to encoder settings for other parts of the video picture, wherein the adjusting is based at least in part on one or more region-of-interest settings associated with the region of interest; and wherein the region of interest is parameterized by information comprising:

information indicating the spatial dimensions of the at least one region of interest; and information indicating the one or more region-of-interest settings;

wherein the information indicating the one or more region-of-interest settings comprises region-of-interest dead zone information comprising inter block dead zone information and intra block dead zone information;

compressing the video picture using the adjusted encoded setting.

11. The method of claim 10 wherein the information indicating the one or more region-of-interest settings comprises region-of-interest quantization step size information.

12. The method of claim 11 wherein the region-of-interest quantization step size information comprises plural quantization step size values, each of the plural quantization step size values associated with a different picture type.

13. The method of claim 11 wherein the information indicating the one or more region-of-interest settings further comprises quantization mode information.

14. The method of claim 10 wherein the information indicating the one or more region-of-interest settings comprises:

plural quantization step size values; and quantization mode information;

wherein the quantization mode information indicates whether the plural quantization step size values are absolute quantization step size values or relative quantization step size values.

\* \* \* \* \*